May 7, 1946.  E. G. GAGE  2,399,671
TRI-DIMENSIONAL RADIO NAVIGATIONAL SYSTEM
Filed April 30, 1943  18 Sheets-Sheet 1
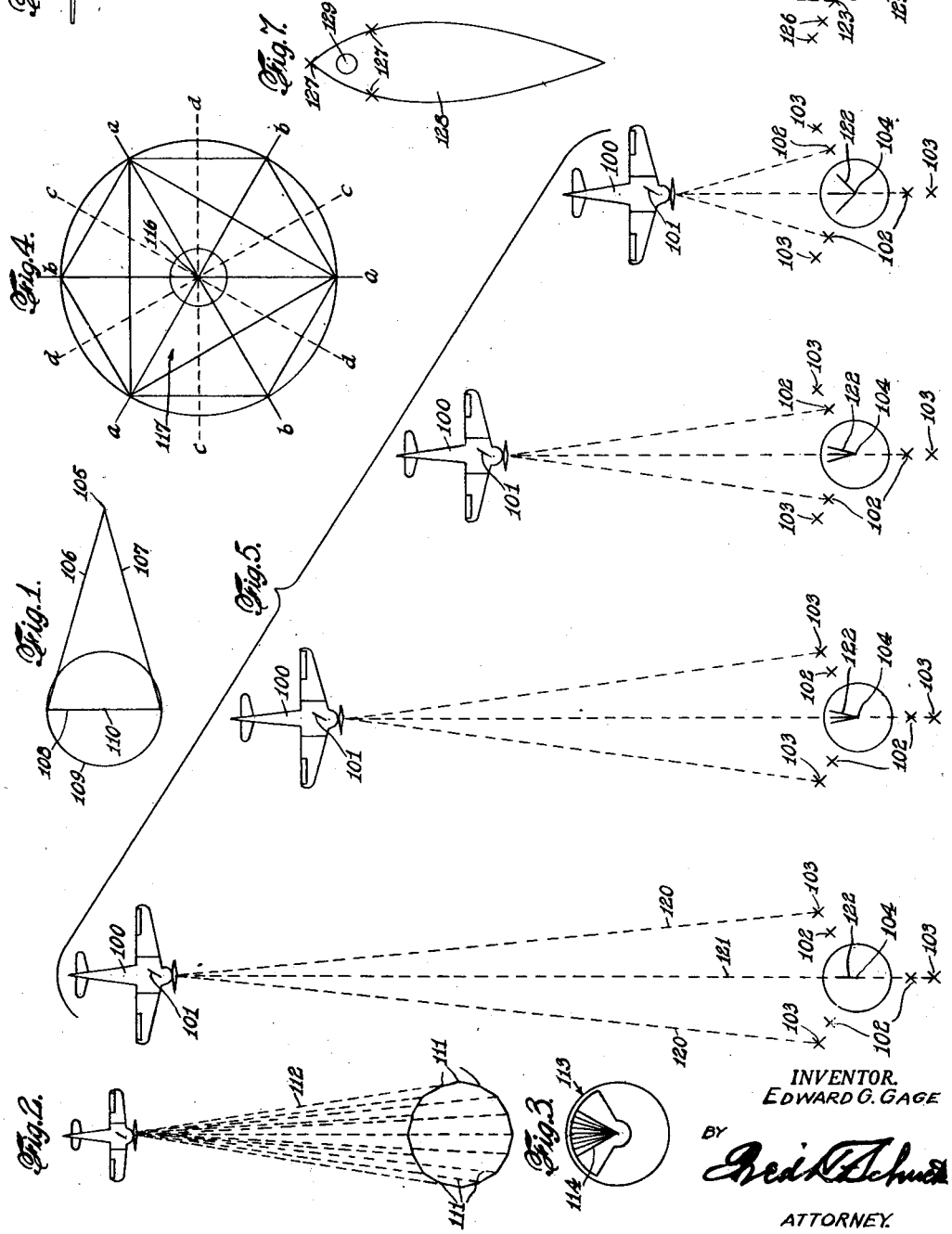
INVENTOR.
EDWARD G. GAGE
BY
ATTORNEY.

May 7, 1946.　　　　　E. G. GAGE　　　　　2,399,671
TRI-DIMENSIONAL RADIO NAVIGATIONAL SYSTEM
Filed April 30, 1943　　　　18 Sheets-Sheet 2
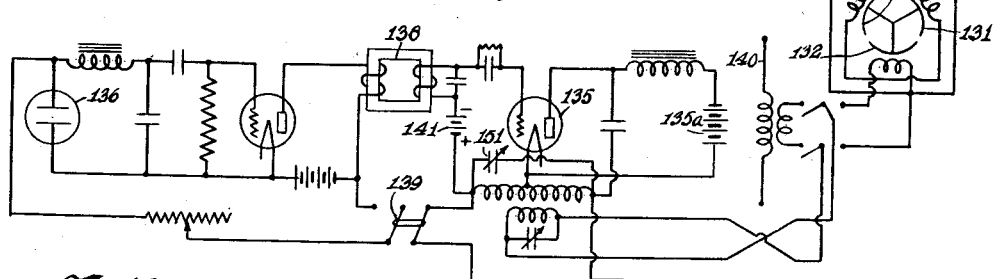
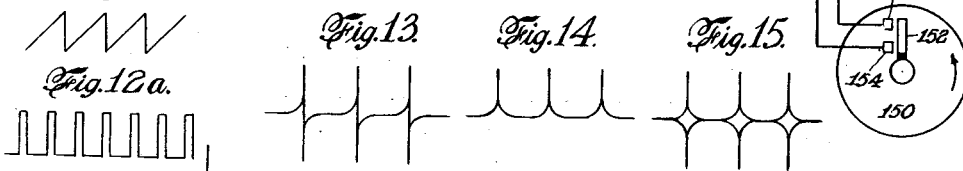
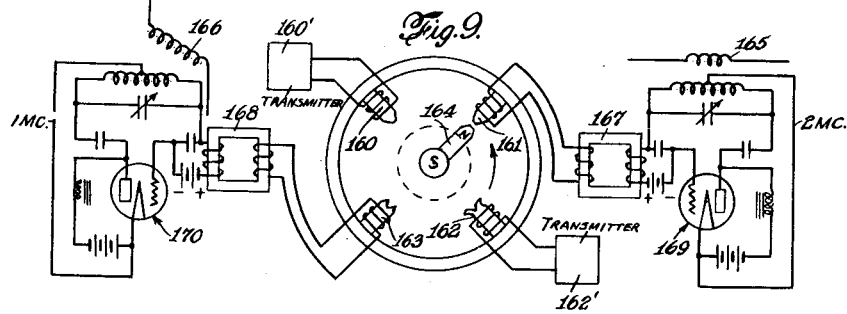
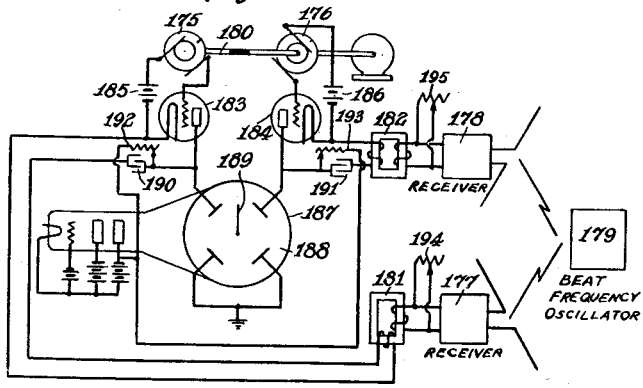
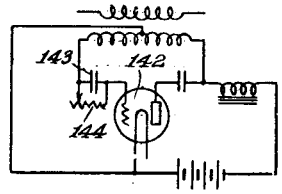
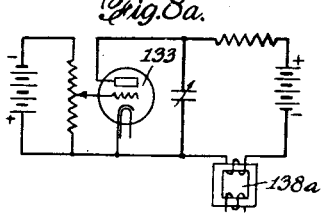
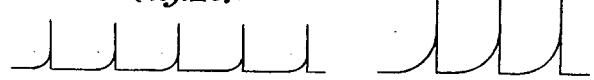
INVENTOR.
EDWARD G. GAGE
BY
ATTORNEY.

May 7, 1946. E. G. GAGE 2,399,671
TRI-DIMENSIONAL RADIO NAVIGATIONAL SYSTEM
Filed April 30, 1943 18 Sheets-Sheet 3

INVENTOR.
EDWARD G. GAGE
BY
ATTORNEY.

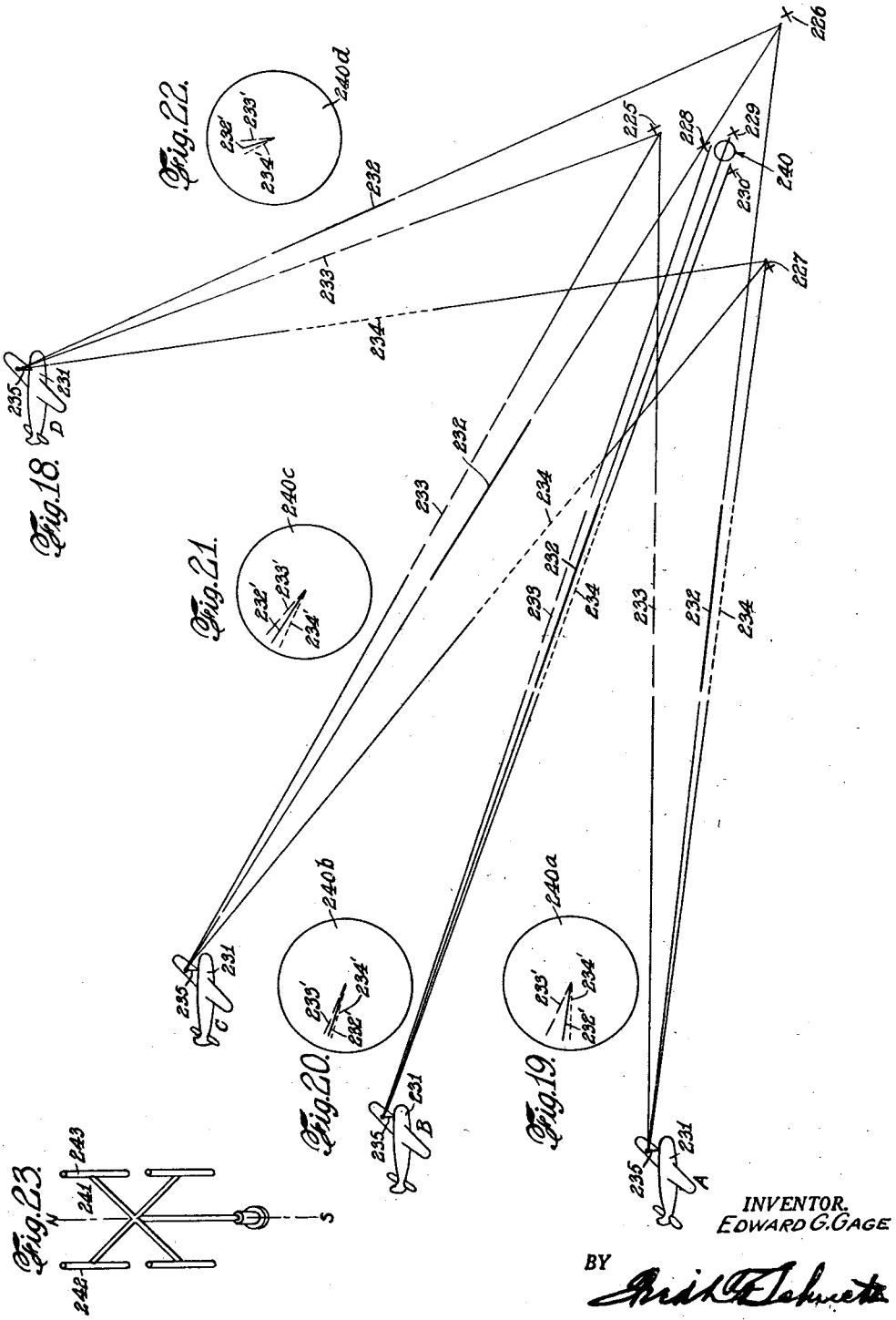

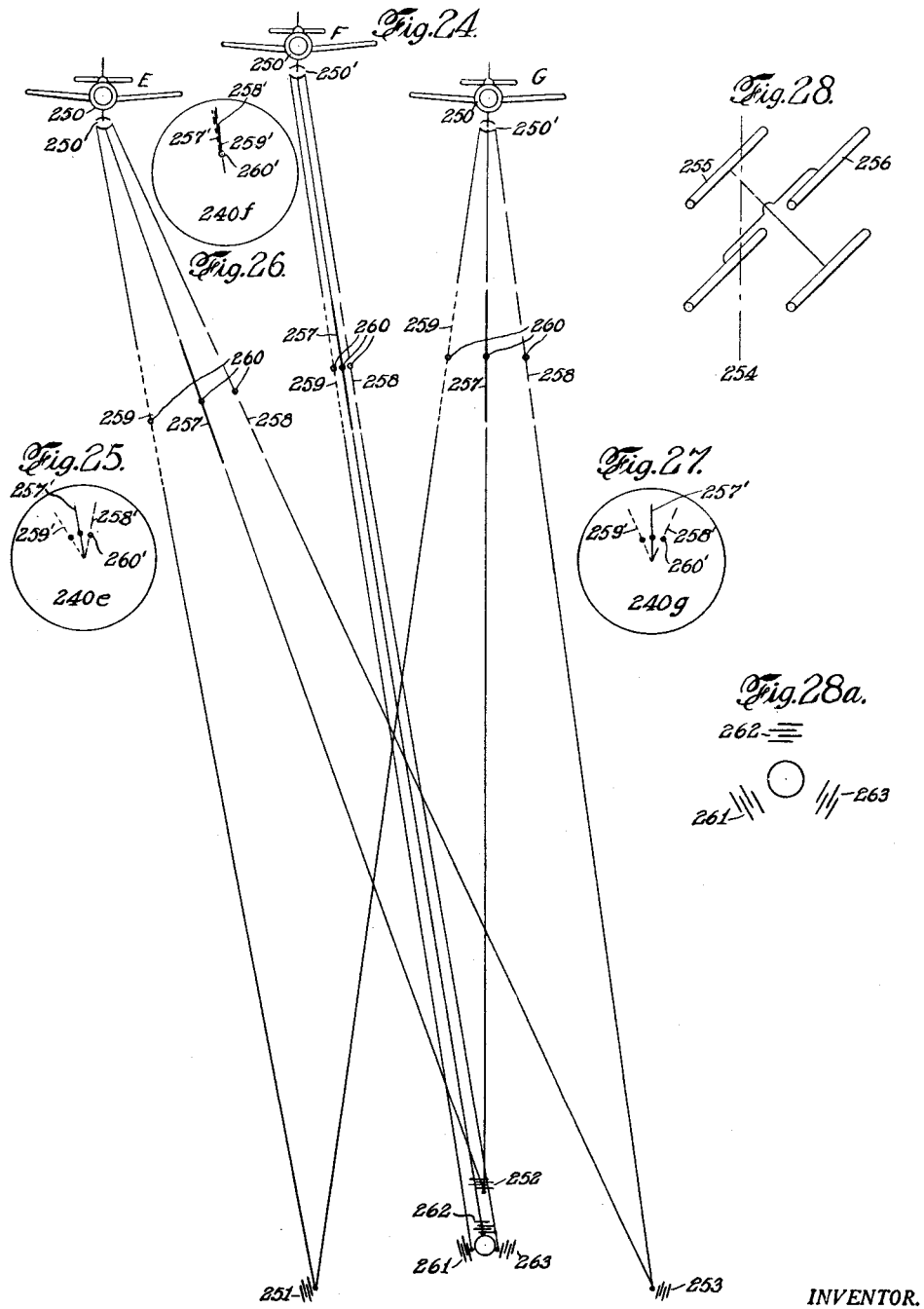

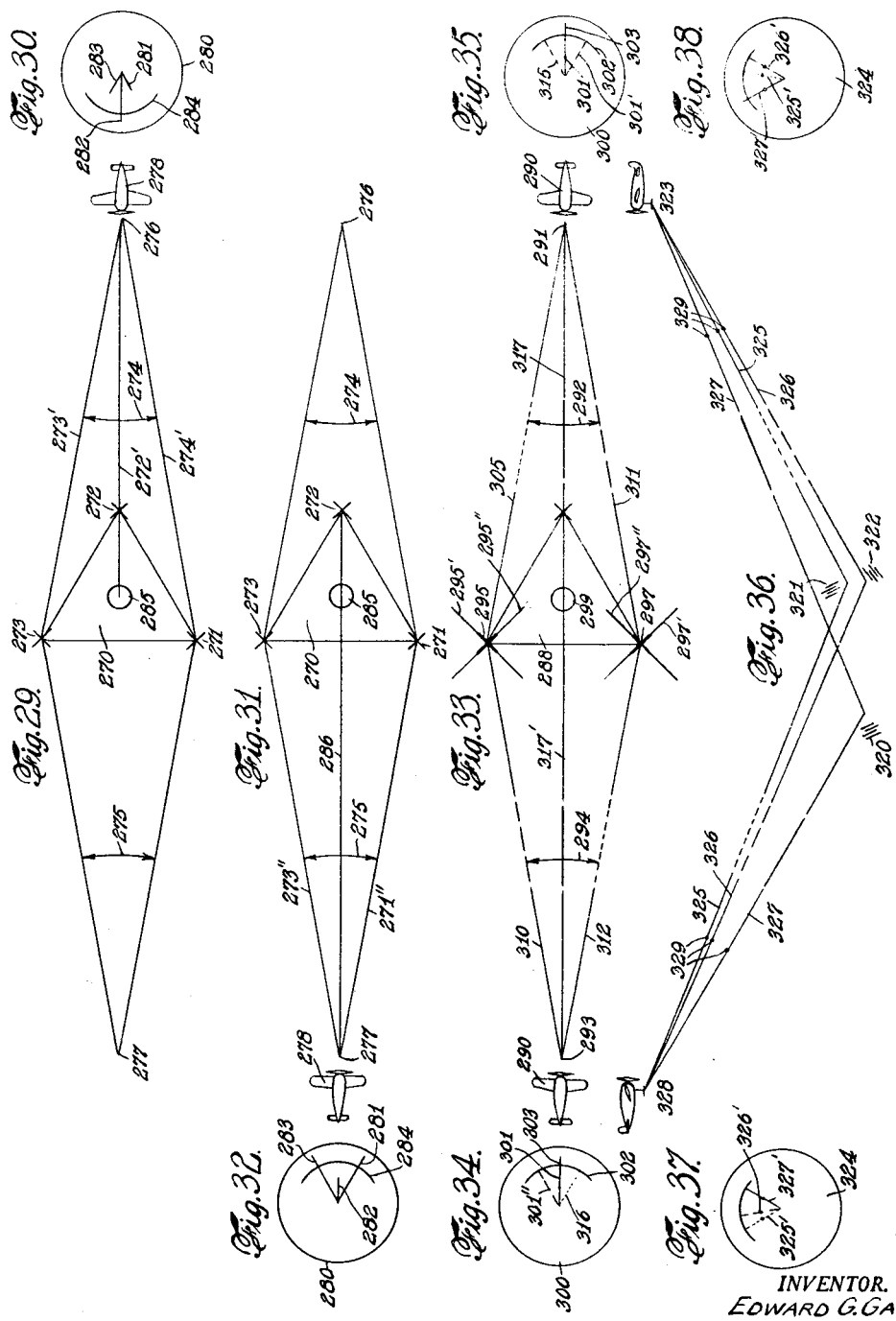

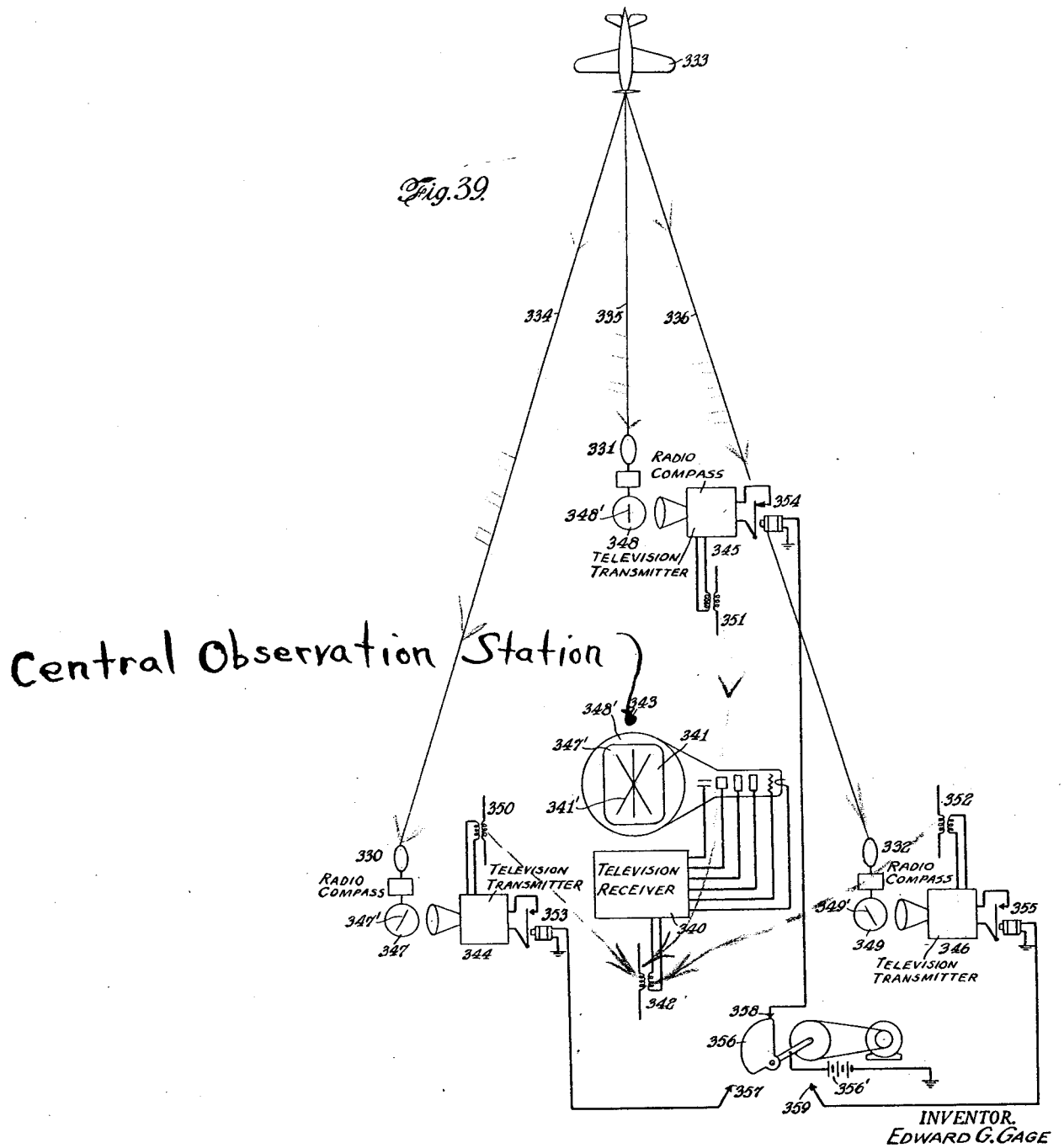

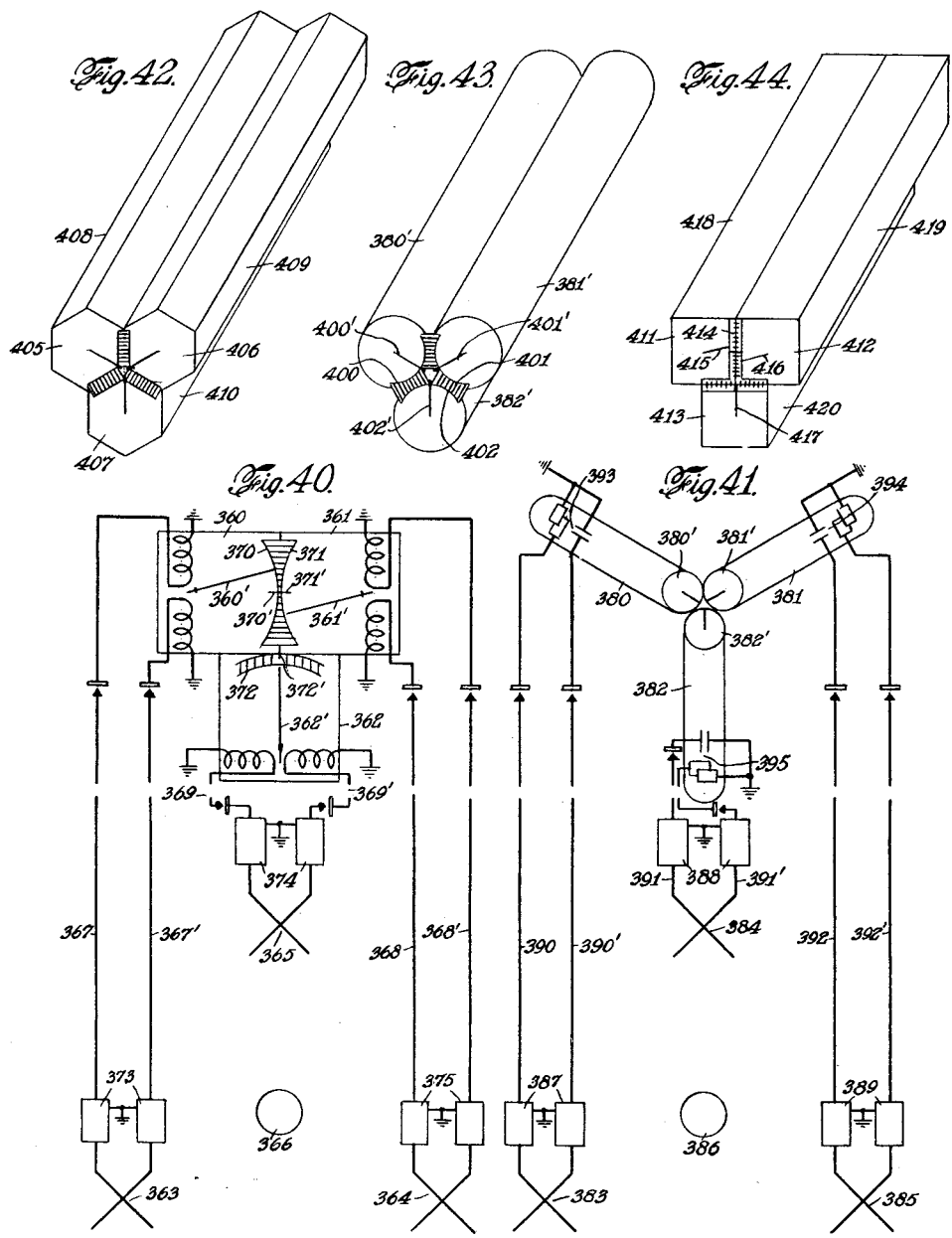

May 7, 1946.  E. G. GAGE  2,399,671
TRI-DIMENSIONAL RADIO NAVIGATIONAL SYSTEM
Filed April 30, 1943  18 Sheets-Sheet 9
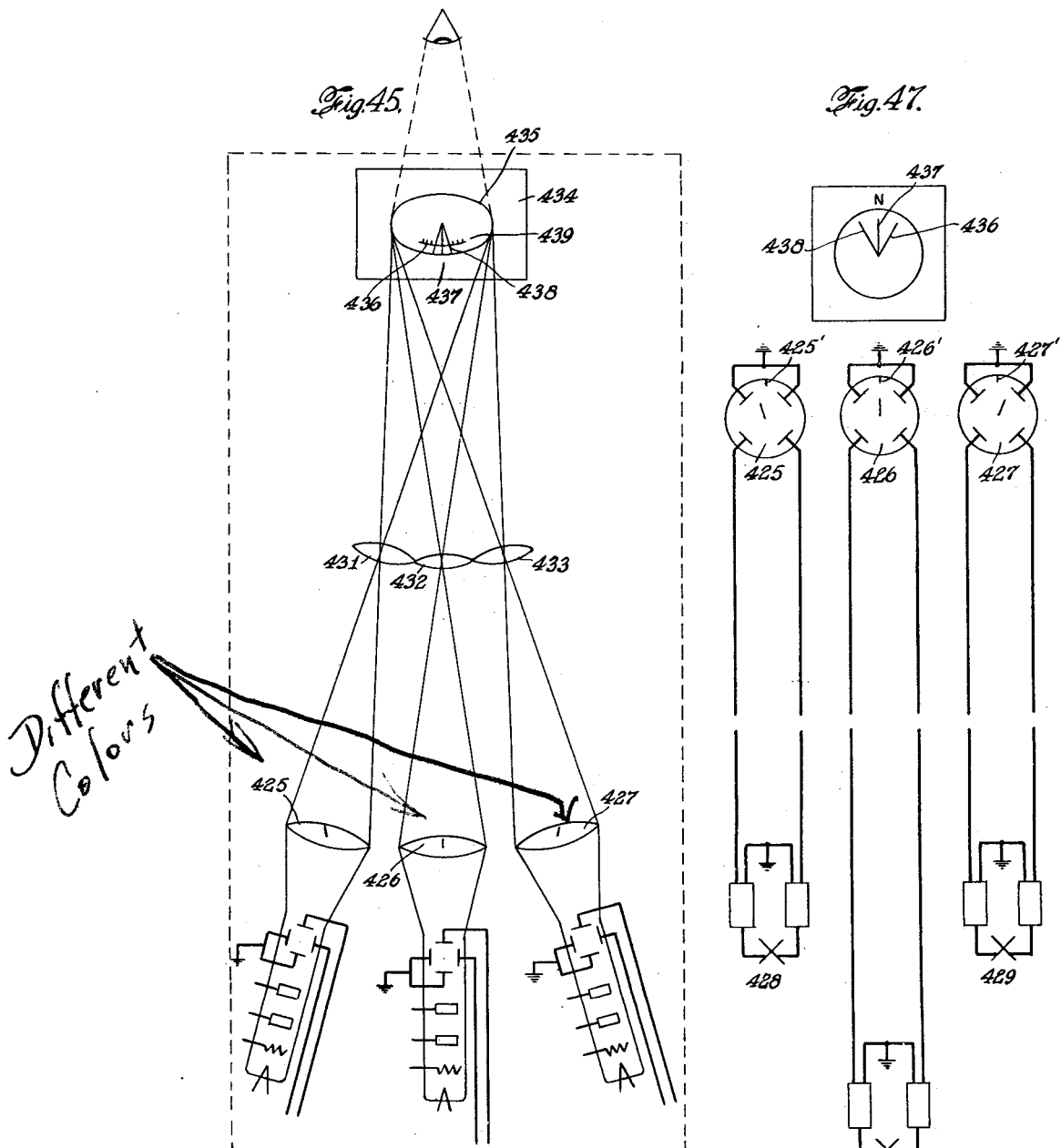
INVENTOR.
EDWARD G. GAGE
BY
ATTORNEY.

May 7, 1946.  E. G. GAGE  2,399,671
TRI-DIMENSIONAL RADIO NAVIGATIONAL SYSTEM
Filed April 30, 1943   18 Sheets-Sheet 10
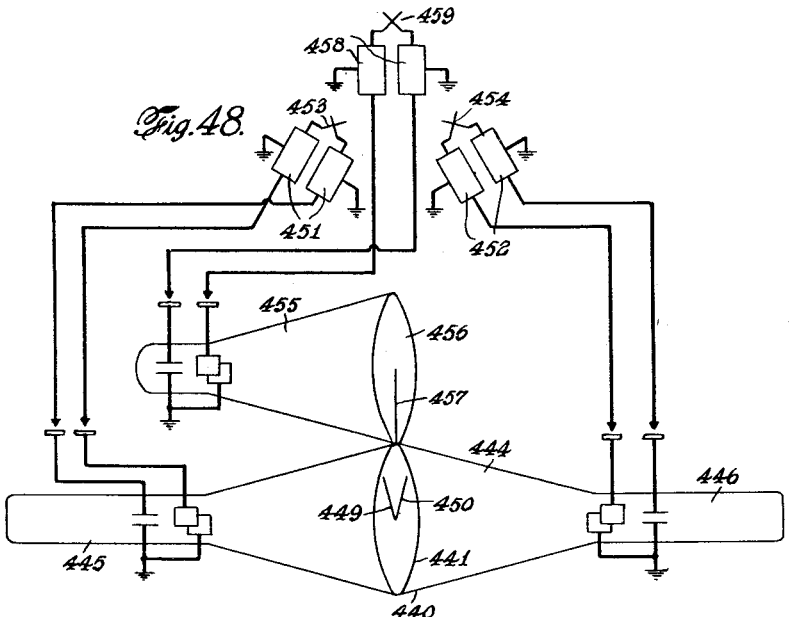
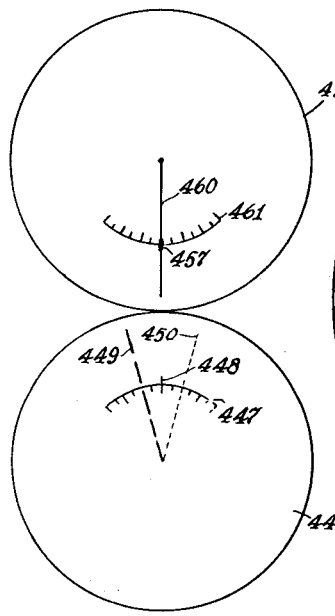
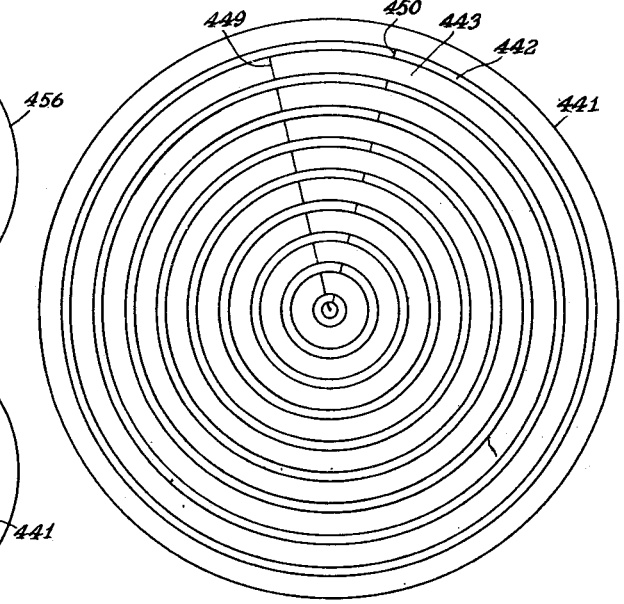
INVENTOR
EDWARD G. GAGE
BY
ATTORNEY.

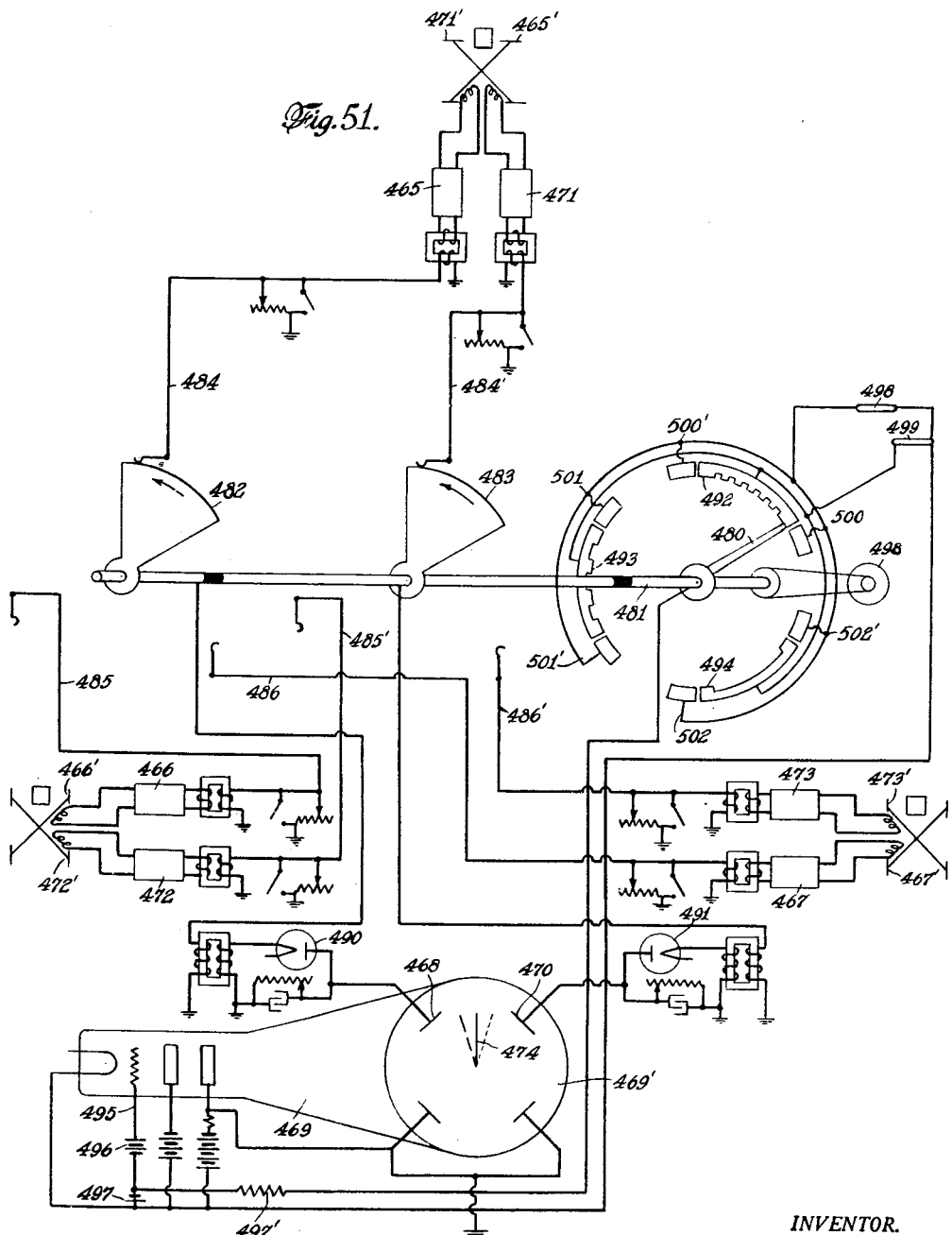

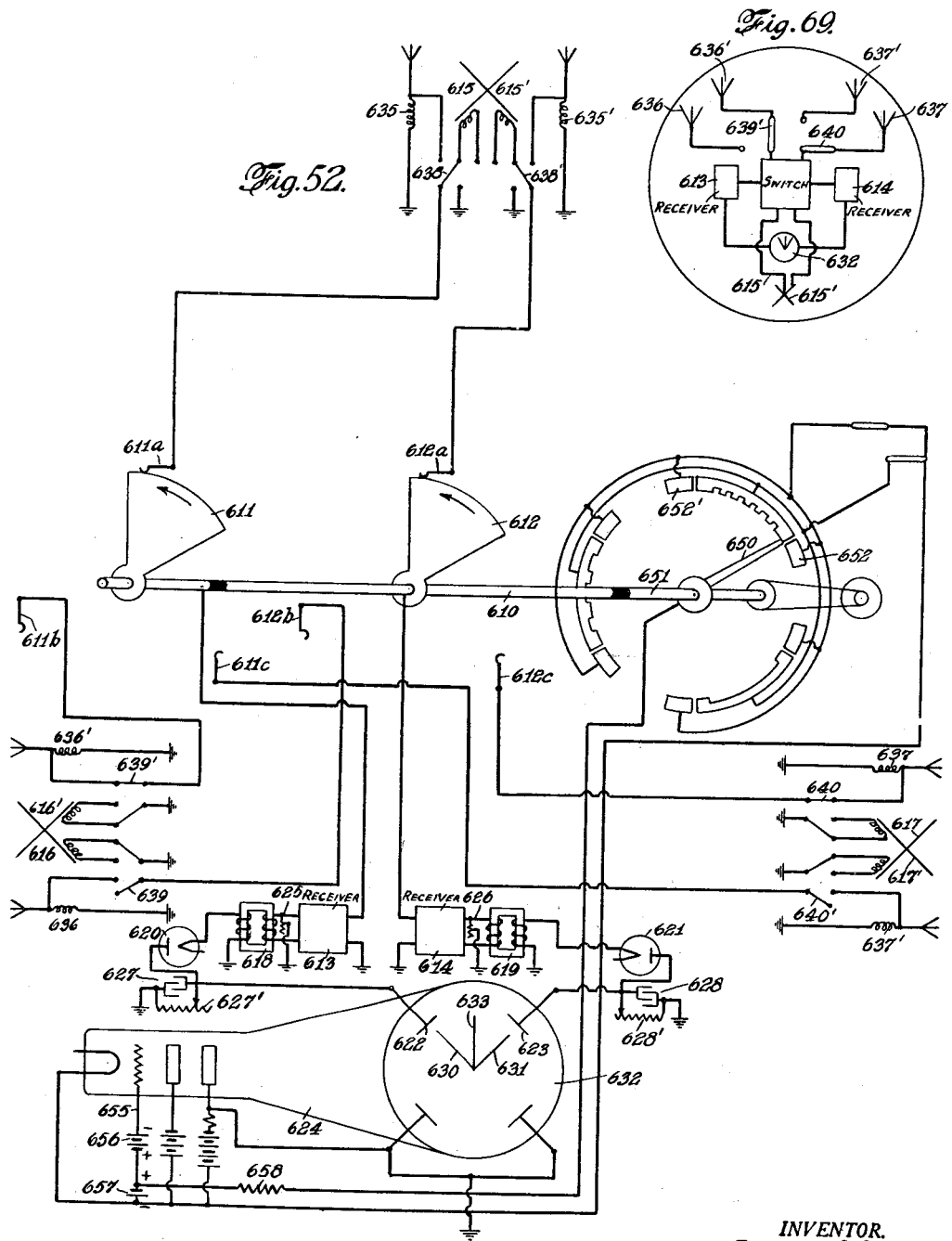

May 7, 1946. E. G. GAGE 2,399,671
TRI-DIMENSIONAL RADIO NAVIGATIONAL SYSTEM
Filed April 30, 1943 18 Sheets-Sheet 13
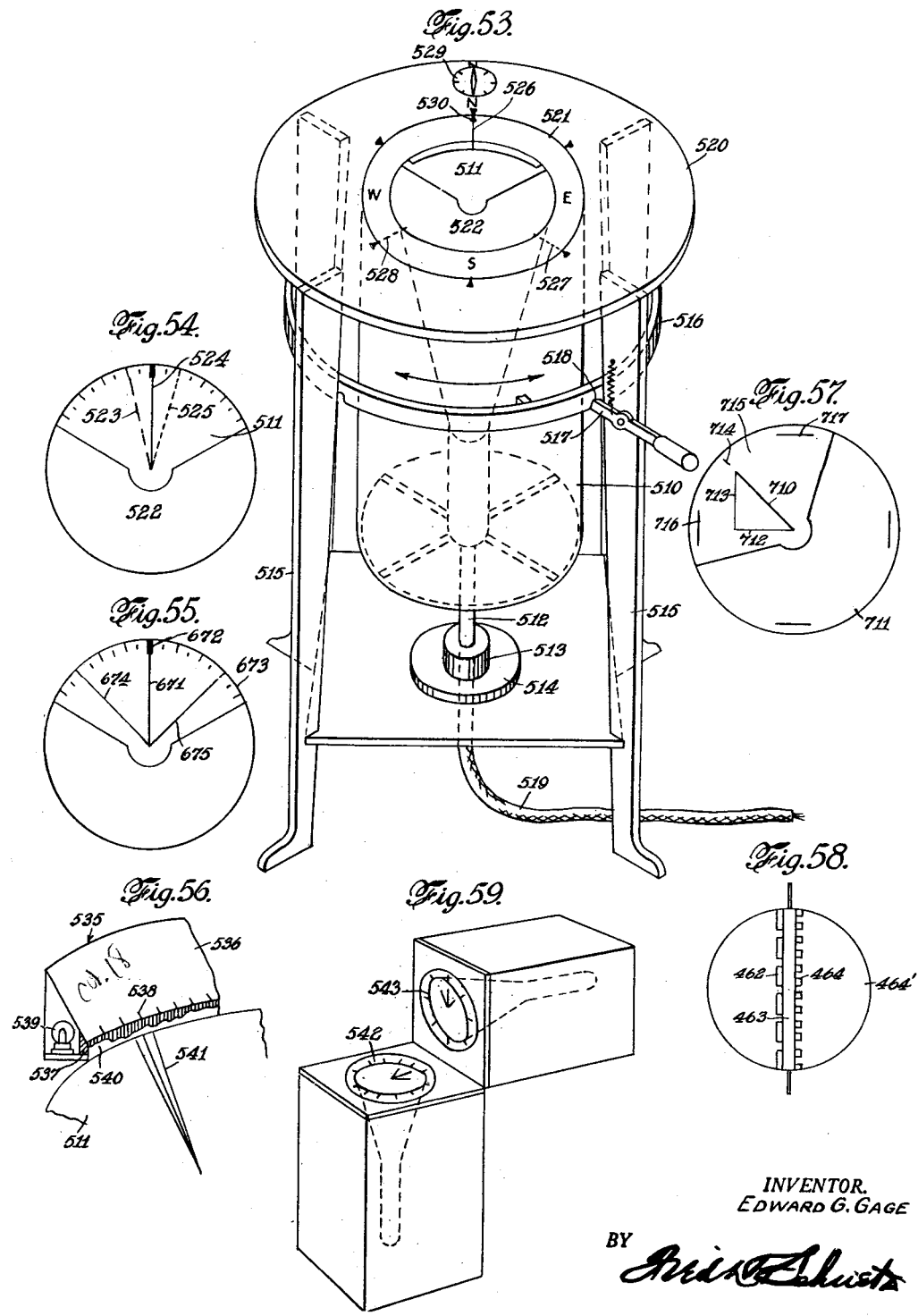
INVENTOR.
EDWARD G. GAGE
BY
ATTORNEY.

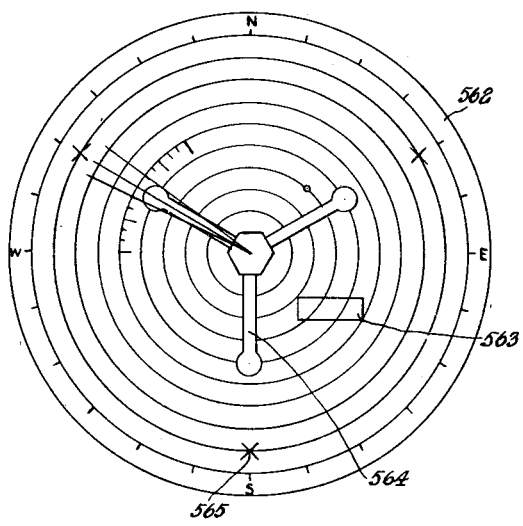
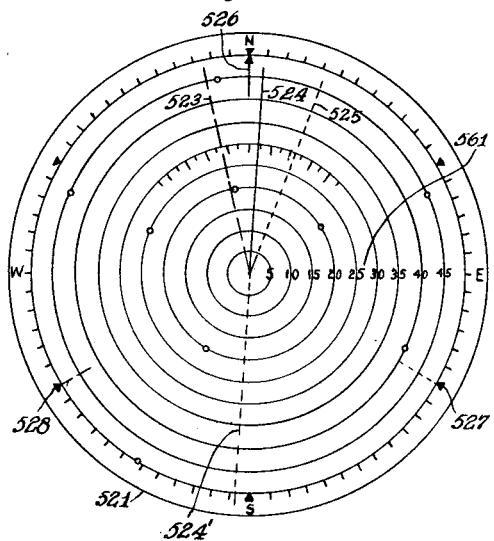
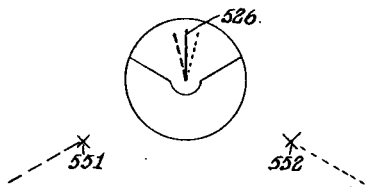
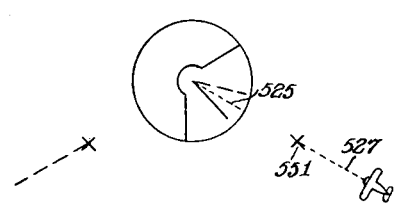
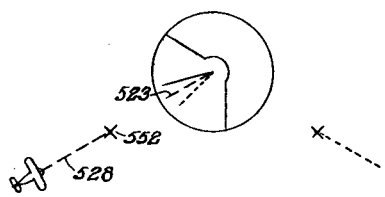
INVENTOR.
EDWARD G. GAGE
BY
ATTORNEY.

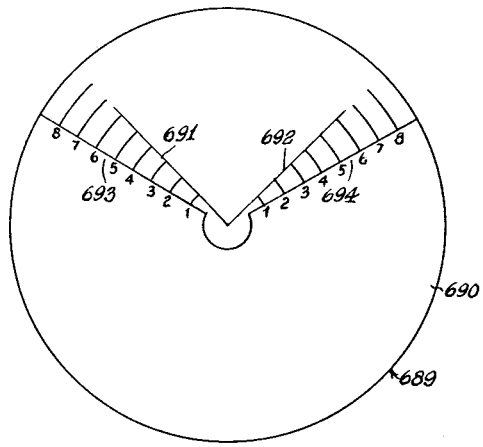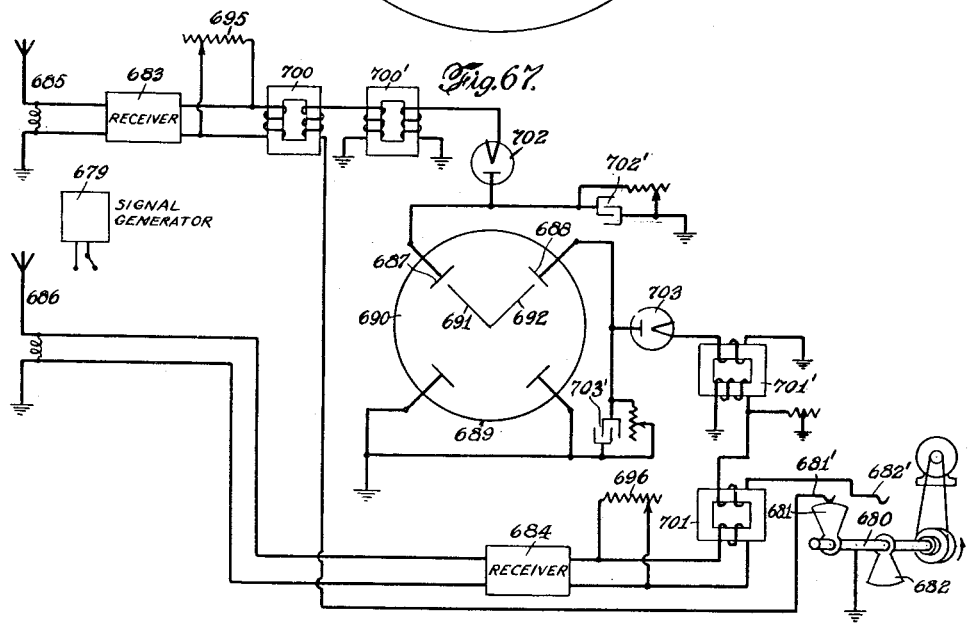

May 7, 1946.　　　　　E. G. GAGE　　　　　2,399,671
TRI-DIMENSIONAL RADIO NAVIGATIONAL SYSTEM
Filed April 30, 1943　　　18 Sheets-Sheet 17
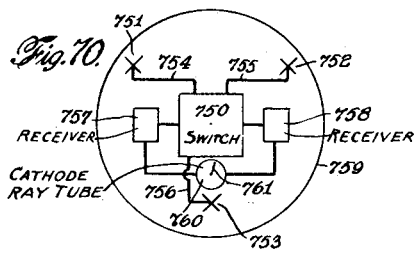
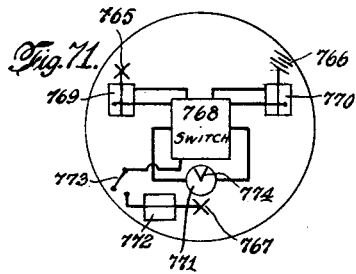
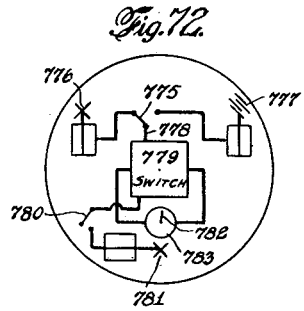
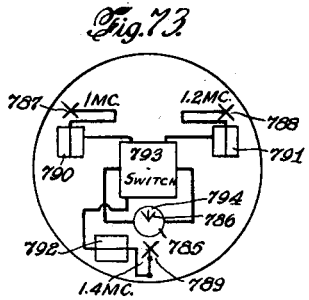
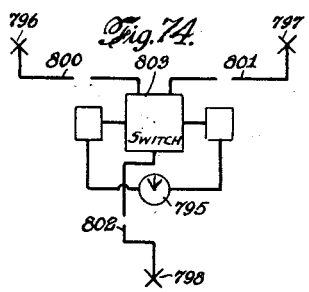
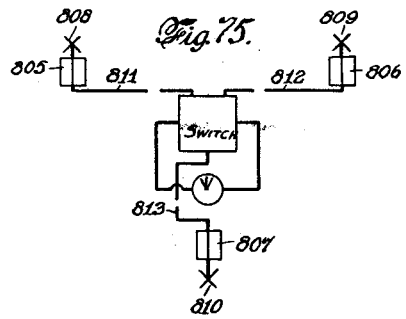
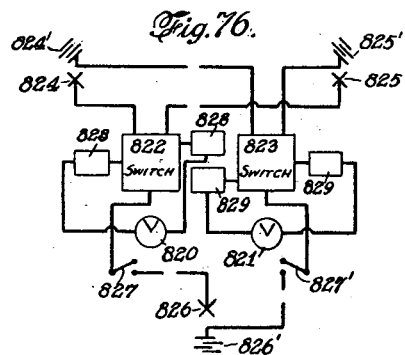
INVENTOR.
EDWARD G. GAGE
BY
ATTORNEY.

May 7, 1946. E. G. GAGE 2,399,671
TRI-DIMENSIONAL RADIO NAVIGATIONAL SYSTEM
Filed April 30, 1943 18 Sheets-Sheet 18
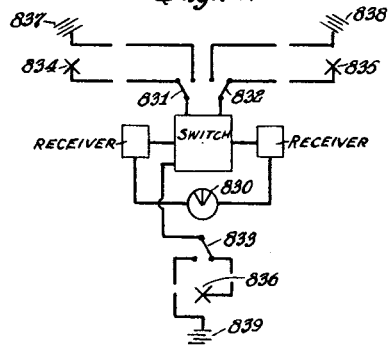
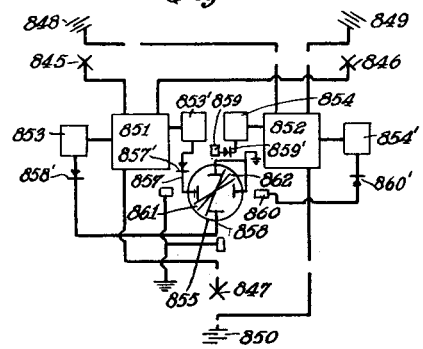
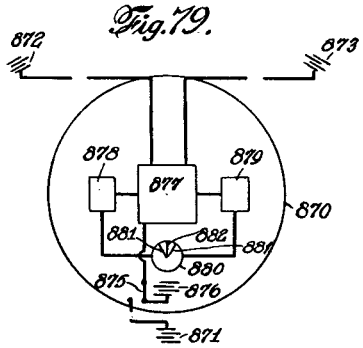
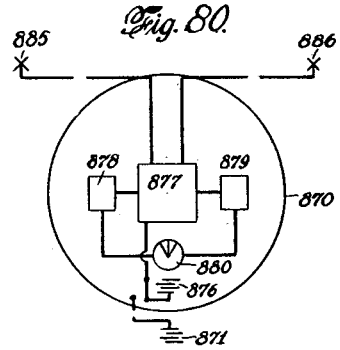
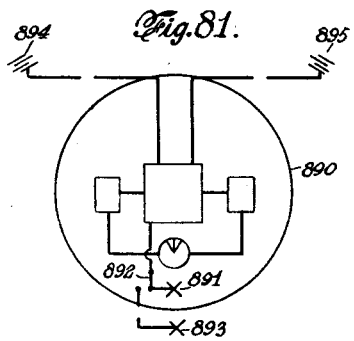
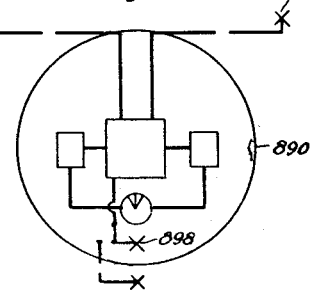
INVENTOR.
EDWARD G. GAGE
BY
ATTORNEY.

Patented May 7, 1946

2,399,671

UNITED STATES PATENT OFFICE 2,399,671

TRIDIMENSIONAL RADIO NAVIGATIONAL SYSTEM

Edward G. Gage, Brooklyn, N. Y., assignor of two-thirds to Leon Ottinger, New York, N. Y.

Application April 30, 1943, Serial No. 485,113

48 Claims. (Cl. 250—11)

The invention relates to systems for locating a source of electromagnetic waves, more especially adapted for the determination of the distance between two points and direction with relation of one of the points to the other, either of which points may be movable with respect to the other. The system is particularly designed for the location of a fast-moving vehicle or craft such as, for example, a high-speed airplane or high-speed motor boat, visual means being provided whereby instantaneous observations may be made.

In a prior Patent #2,255,659, I have disclosed an arrangement of transmitting and receiving apparatus which requires a minimum number of transmitters, the same being used in groups to radiate at all times a substantially 360° circular pattern from a predetermined location. This will permit a moving vehicle, such as an airplane, to be guided to the center of the landing field bounded by the said transmitters from substantially any direction and it will afford means for measuring the distance of the moving vehicle in any direction from the transmitter system.

The present invention involves a system which is of a nature somewhat reverse in its operation of the aforesaid patented system. Thus, but a single transmitter station is utilized, while the transmitters of the patented system are replaced by direction-finding receiver units similarly located in a predetermined pattern within which is located the point of observation, preferably centrally of the direction-finding units or in association with a selected one of these units.

Provision is made for transmitting to a visual indicator located at the observation point the respective effects of the energy received by the several direction-finding units, these effects being juxtaposed in a novel manner at the visual indicator, for example, upon the screen of one or several cathode ray tubes, and with respect to one another and to a scale or scales associated therewith.

The novel system may be considered to be based upon the following theorem:

If the diameter of a circle forms the base of an isosceles triangle, and the vertex is a point outside the circle, the angle formed by the two arms will be indicative of the distance from the vertex to the center of the circle.

The requirements necessary to reduce this theorem to practice would be too severe, as an infinitely large number of radio direction-finding stations would be necessary, distributed on the circumference of a circle. Accordingly, a more suitable variation of the theorem is involved in the practical embodiment which reduces the number of radio direction-finding stations necessary.

In a more practical form the theorem may be expressed as follows:

If the diagonal of a regular polygon having an even number of sides forms the base of an isosceles triangle, the vertex of which is outside the polygon, the angle formed by the two arms of the triangle will be indicative of the distance from its vertex to the center of the polygon.

The system then operates practically on the above theorem in the following manner. An airport, for example, is designed in the form of a regular polygon having an even number of sides such as a hexagon, as in the system hereinafter described. Such a figure has six possible diagonals.

A radio direction-finding station may be located at each of the six vertices of the regular polygon so formed. A moving craft, such as an airplane equipped with a radio transmitter, represents then the vertex of an isosceles triangle, located outside the polygon and approximately in the same azimuthal plane.

Two of the six direction-finding stations located at diametrically opposite vertices of the polygon (airport) are selected as the point of intersection of the base and arms of the isosceles triangle, the base being the diagonal. This diagonal will be the one which is nearest at right angles to a line drawn from the vertex of the isosceles triangle to the center of the polygon, since this is the only diagonal which will form the base of an isosceles triangle. All the others form sides of unequal angles.

If a line is drawn from the craft intersecting one vertex of the polygon, or radio direction-finding station, and another line from the craft intersects a diametrically opposite vertex of the polygon, or another radio direction-finding station, it will be found that an isosceles triangle has been formed, the base of which is the diagonal of the polygon, the vertex is the craft outside, and the two arms are the lines joining the vertex with the base.

The two arms represent hypothetical lines formed by the path of radio reception from the craft to the direction-finding stations, and the reception width of this path or line is indicative of the direction discrimination of the direction-finding means.

The degree of angle at the vertex of the isosceles triangle represents the distance of the craft from the center of the airport, and this angle will always be formed when the craft is at this distance from the center of the airport.

In practice, a polygon is selected which will best suit the conditions under which the system is to operate. In general, the greater the number of sides, the greater will be the accuracy of the measurements taken.

A regular polygon having an odd number of sides or vertices may be used to define the location of the direction-finding stations, but if this form is selected, the distance-measurements will not be from a point in the center of the polygon, but from a point on the polygon diagonal or base of the isosceles triangle. It is not necessary to form the base of the isosceles triangle from the diagonal of the polygon. It may be formed from one of the sides, but in this instance also the distance is measured from the vertex of the isosceles triangle to a point on the side of the polygon, although, by calibration, this point may be shifted to the center of the polygon by projecting a median from the vertex of the isosceles triangle to a point in the center of the polygon, and suitable correction made on the calibrated scale.

It is obvious that when any figure except a circle is used to define the direction-finding station locations, there must be sacrifices made as to accuracy, and in the interest of practical economy. One of the best polygonal figures is found to be a hexagon because alternate vertices of the figure may be omitted, leaving a triangle, and still maintain the desired omni-directional reception features. This is possible because every direction from center is duplicated at 180°, and if the 180° ambiguity can be eliminated, then half the number of vertices on a polygon may be omitted.

In its simplest embodiment, the novel system comprises three stations or direction-finding receiving units located as hereinbefore set forth with a single transmitter station on the craft remote from these stations, and is designed for measuring in azimuth only. However, by constructing the transmitter with a horizontally and a vertically polarized transmitting antenna system and associating with the respective direction-finding receiving units additional antennae correspondingly polarized, determinations in zenith or altitudinal measurement may also be made, it being understood, of course, that the respective determinations are transmitted at different frequencies to juxtaposed positions on one or more visual indicator means.

It is to be understood, also, that the transmitter may be located at a stationary point and the group of respective direction-finding receiver units on a mobile vehicle. The visual indicator means utilized in connection with the novel tri-dimensional navigational system described herein requires simultaneous viewing of all direction-finding indicators in juxtaposed relation to one another and to a suitably calibrated scale.

A preferred form of receiving indicator is the cathode ray screen actuated from two direction-finding systems, such as crossed loops or crossed Adcock antennae, according to the general scheme of the original Watson-Watts cathode ray compass. Meters may also be used but are not adaptable to rapid switching, that is, they cannot be instantly switched from one set of receivers to another without fluctuation of the meter needles.

The invention has for an object to provide a system and apparatus by which substantially instantaneous determinations may be made at an observation point both of the direction and the distance from a given point of a transmitter of electromagnetic waves, remote from the point of observation, either of which may be stationary or movable.

The invention has for an object, also, to provide for a novel system wherein measurements in azimuth as well as altitudinal measurements may be effected instantaneously, that is to say, by viewing characteristic indicia on a screen.

Another object of the invention is to provide means whereby it becomes possible to determine from an inspection of a visual indication the particular geographical sector over which the direction-finding signal energy is being received by a plurality of direction-finding units fixedly located relatively to each other and to the location of the point of measurement.

Still another object of the invention is to provide suitable indicia corresponding to respective direction-finding receiver unit locations, said indicia, for example, being constituted as straight-line images upon a cathode ray screen, which images may be of different color or of different light continuity thereover, and the combination of such lines will afford distribution patterns indicative of the measurements; or mechanical indicia such as meter needles of different colors similarly combined to afford the distribution patterns.

Still another object is to provide straight-line images upon the screen of a cathode ray tube indicative of the respective direction-finding receiver unit locations, which images diverge from the center of the said screen in one quadrant only and the two outermost serve as a measure of distance of the remote transmitter and the one nearest the middle serves to determine the geographical sector over which the transmitter is operated as well as its direction.

Still another object of the invention is to provide in connection with the direction-finding units a pair of receiver members with translation or amplifier means, together with means for equalizing respective amplification gain of each of the translation means by comparing their effects simultaneously upon a single screen of a cathode ray tube.

A further object is to televise to the screen of a cathode ray tube respective indicia from direction-finding units when these indicia are of a character to require pictorial representation.

The invention has for an object, also, to provide modulating means for the transmitted or received energy, said means being in the nature of a pulse generator.

A further object of the invention is to associate several visual indicator means receiving respectively the energy effects from differently located direction-finding units.

A still further object is to provide a double viewing cathode ray screen for simultaneous viewing of two images; also, to provide for the association of a group of cathode ray screens in close proximity such as a means for affording simultaneous viewing of the images of each cathode ray tube.

Still another object is to provide indicia on the screen of cathode ray tubes particularly indicative of dimensions to be measured.

The invention has for an object, also, to provide a rotary switch for connecting sequentially the elements of a cathode ray tube to different direction-finding means, said switch having means synchronous with its contact-changing means to extinguish the beam light of the tube when change-over is being made.

A further object of the invention is to prevent parasitic effects on the screen of a cathode ray tube during the switching-in of circuits of various direction-finding antennae.

Another object is to provide for a plurality of groups of direction-finding units in concentric relationship to accommodate various distance and direction ranges and to insure more accurate measurements.

The nature of the invention, however, will best be understood when described in connection with the accompanying drawings, in which:

Fig. 1 is a geometrical representation illustrating the principle involved in the novel system of measurement.

Fig. 2 is a diagrammatic view of an aircraft provided with transmitter of electromagnetic waves, and indicates an ideal condition in the multiple reception from many angles of a single wave train.

Fig. 3 illustrates a cathode ray screen with corresponding line representation of the various reception angles under the conditions indicated in Fig. 2.

Fig. 4 is a diagrammatic representation showing the principal angles of approach with relation to a determined number of stations.

Fig 5 is a diagrammatic showing of an aircraft in its relation to an observation station, the craft being indicated at various distances in azimuth varying from long range to a location in close proximity to the observation station, the corresponding indicator line positions being depicted on a cathode ray screen and obtained from different direction-finding units positioned about the observation station more or less remotely therefrom.

Fig. 6 is a similar representation with craft at long range from the observation station and with radio reception paths drawn to one of the groups of receiver unit locations at the observation station.

Fig. 7 illustrates the disposition of direction-finding antennae and observation station on a marine craft.

Fig. 8 is a schematic diagram of a craft transmitter system suitable for transmission in two planes, and Fig. 8a illustrates a modulator for use therein.

Fig. 9 is a schematic diagram illustrating a specific form of pulse generator connected in the transmitting system and adapted for modulating two differently polarized waves of different frequencies.

Fig. 10 is a schematic diagram illustrating the use of a specific form of pulse generator adapted for modulating received continuous waves at the receiver.

Fig. 11 is a schematic diagram of a combined pulse generator and oscillator transmitter circuit, and Fig. 11a illustrates the wave form resulting from the use thereof.

Figs. 12, 12a illustrate two pulse generator wave forms respectively of saw-tooth and flat-top type, which may be produced by the arrangement shown in Fig. 8.

Fig. 13 illustrates the wave form of the electro-dynamic pulse generator shown in Fig. 9.

Fig. 14 illustrates the wave form of the electrostatic pulse generator shown in Fig. 8.

Fig. 15 shows the moludation envelope of the wave form shown in Fig. 13, when applied to the circuit shown in Fig. 9.

Fig. 16 illustrates the wave form of the pulse generator wave form shown in Fig. 13 after rectification for application to the deflector plates of the cathode ray tube shown in Fig. 10.

Figure 17:
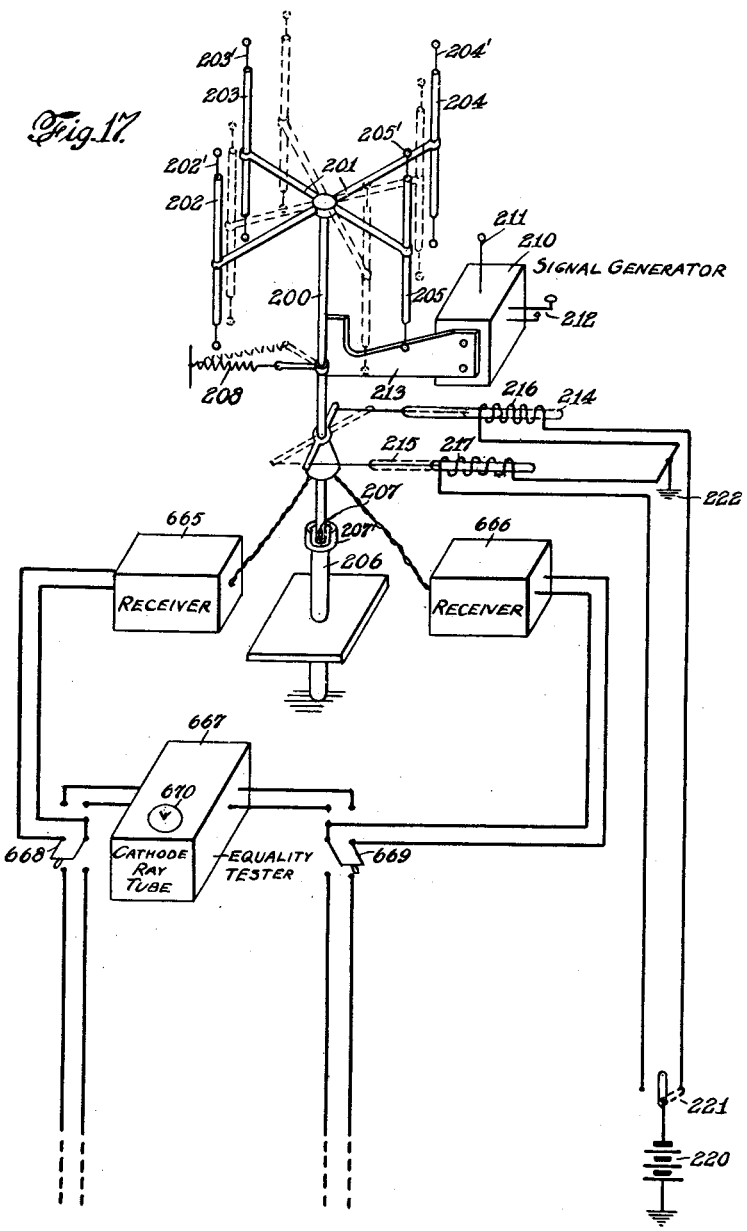

Fig. 17 illustrates in perspective means for orienting in a horizontal plane a vertically polarized antenna system with attached signal generator, together with antenna-equalizing equipment.

Fig. 18 is a diagrammatic representation of an observation station with direction-finding receiving units arranged thereabout for measurements in azimuth of the distance of an aircraft flying at different elevations.

Figs. 19, 20, 21, and 22 are diagrammatic views of a cathode ray screen with the indications depicted thereon of the corresponding craft positions shown in Fig. 18.

Fig. 23 is a view in perspective of one form of antenna suitable for reception of electromagnetic waves in azimuthal determinations.

Fig. 24 is a diagrammatic representation of the grouping of direction-finding receiving units for altitudinal measurements of distance of an aircraft at various angles with respect to the observation station and at different ranges.

Figs. 25, 26, and 27 are diagrammatic views of a cathode ray screen with the indications depicted thereon of the corresponding craft positions shown in Fig. 24.

Fig. 28 is a view in perspective of one form of antenna suitable for reception of electromagnetic waves in altitudinal determination, and Fig. 28a shows in plan the grouping of such antennae.

Fig. 29 is a diagrammatic representation of a triangular disposition of direction-finding units with possible reception angles in azimuth from a craft to illustrate a method of determining 180° ambiguity; and Fig. 30 is a diagrammatic view of a cathode ray screen with the indications depicted thereon of the corresponding craft positions.

Figs. 31 and 32 are similar views but with the craft located diametrically opposite the position shown in Fig. 29.

Fig. 33 illustrates diagrammatically another method of determining the 180° ambiguity; and Figs. 34 and 35 are diagrammatic views of cathode ray screens with the indications depicted thereon of possible craft positions.

Fig. 36 is a diagrammatic view in perspective of a triangular disposition of direction-finding units with possible reception angles in elevation; and Figs. 37 and 38 are diagrammatic views of a cathode ray screen with the indications depicted thereon of corresponding craft positions.

Fig. 39 illustrates diagrammatically a distance-determining arrangement wherein the indications are effected by means of automatic radio compasses, the repective indications being televised to the observation station.

Fig. 40 illustrates diagrammatically a group of radio direction-finding stations with corresponding receivers, the output of each receiver being connected to a visual indicator of the dynamometer type, the indicators having their scales juxtaposed.

Fig. 41 is a similar representation in which the screens of cathode ray tubes constitute the visual indicator.

Figs. 42, 43 and 44 illustrate different arrangements of cathode ray tubes for convenient juxtaposition of their viewing screens.

Fig. 45 represents diagrammatically an optical system for viewing and magnifying differently colored cathode ray screens for purposes of identification of direction-finding receiver unit location.

Fig. 46 represents a schematic diagram showing the direction-finding receiving stations of Fig. 45 and the alignment of the screens of the cathode ray tubes to which the said stations are connected; and Fig. 47 the combined indications on a common ground-glass screen.

Fig. 48 represents a schematic diagram showing three direction-finding receiving stations connected to a novel combination of three cathode ray tubes in which two of the tubes have a common viewing screen for distance indications and the other provides a juxtaposed screen for indications of direction.

Fig. 49 shows an enlarged plan view of the juxtaposed viewing screens shown in Fig. 48 with corresponding distance and direction scales mounted thereon.

Fig. 50 shows in plan a novel viewing screen common to the two tubes.

Fig. 51 is a schematic diagram illustrating mechanism and circuits for sequentially switching in circuit the energies from the respective direction-finding antennae each through a corresponding local two-channel receiver means, the outputs of which energize a single cathode ray tube and through a sequential switching device at the same time impart identifying characteristics to the respective indications.

Fig. 52 is a similar view wherein each of the direction-finding antenna systems is connected through a two-channel receiver common thereto selectively to the cathode ray tube.

Fig. 53 is a perspective view of the novel radio compass used in the system provided with means for selective angular displacement of its live quadrant.

Figs. 54 and 55 represent cathode ray screen views of the compass shown in Fig. 53 with distance and test indicia respectively depicted thereon.

Fig. 56 is a fragmentary enlarged view in perspective of a novel scale member which may be utilized in connection with the screen.

Fig. 57 is a view of the cathode ray screen shown in Fig. 53 with a modified form of signal line depicted thereon.

Fig. 58 illustrates the appearance of partially merged signal lines as seen under a powerful lens.

Fig. 59 represents a convenient arrangement of two cathode ray tubes designed respectively for showing the indications in azimuthal and altitudinal determinations.

Fig. 60 is an enlarged plan view of a cathode ray screen overlaid with a cartograph representative of the terrain immediately surrounding the observation station, for example an airport.

Fig. 61 is a similar view representative of the outlying territory surrounding an observation station.

Figs. 62, 63, and 64 are diagrammatic views illustrating the relationship between quadrantal screen indications and overlapping earth sectors with identification marks for each sector.

Figure 65:
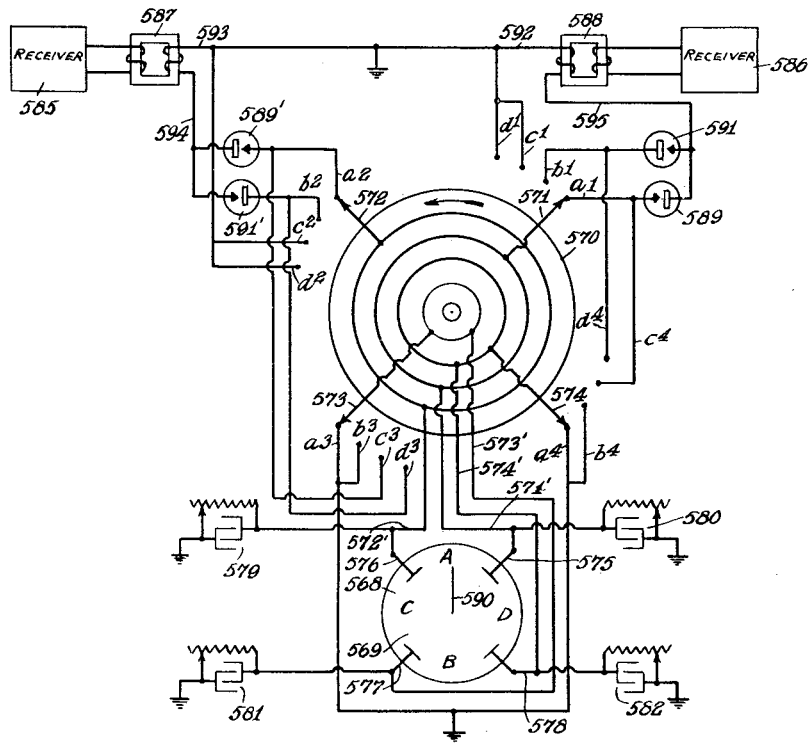

Fig. 65 is a schematic diagram of a switching device associated with a cathode ray tube for electrically shifting the live quadrant of the tube.

Figure 66:
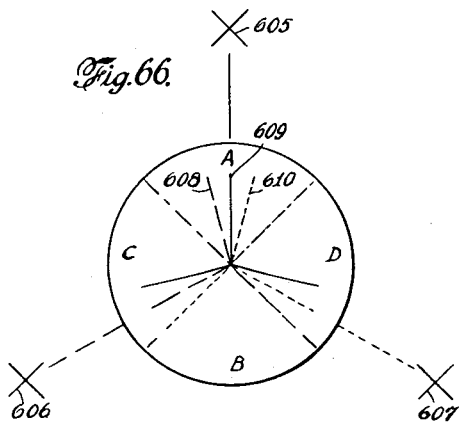

Fig. 66 illustrates diagrammatically the position of the indicia when shifted to different sectors.

Fig. 67 represents diagrammatically an arrangement for securing equalization of the outputs of the output circuits of both halves of a two-channel receiver means used in the novel system.

Fig. 68 is a plan view of a cathode ray screen with equalizing scales for association with the indicia to be equalized.

Fig. 69 is a block diagram illustrating simultaneous reception of direction-finding and translation equalizing signals.

Figs. 70, 71, 72 and 73 are block diagrams showing the arrangement of direction-finding stations at the observation station, respectively, for determination of absolute direction in azimuth, for both azimuthal and altitudinal direction-determination simultaneously, for both azimuthal and altitudinal direction-determinations alternatively, and for simultaneous direction readings in azimuth from a plurality of craft transmitters.

Figs. 74, 75 and 76 are block diagrams showing the arrangement of direction-finding stations remote from the observation station for determination of comparative direction, Fig. 74 setting forth a two-channel receiving means common to all of the direction-finding stations and Fig. 75 setting forth individual two-channel receiver means for the respective direction-finding stations; while Fig. 76 is a block diagram embodying the common two-channel receiver arrangement with duplex arrangement of circuits and direction-finding stations for determinations of azimuthal and altitudinal comparative direction and distance.

Fig. 77 is a block diagram embodying the two-channel receiver arrangement with provision for making alternatively azimuthal or altitudinal determinations of distance.

Fig. 78 is a block diagram illustrating a further modification of the duplex circuit type admitting of simultaneous indication upon a common viewing screen of azimuthal and altitudinal determination of distance.

Figs. 79, 80, 81 and 82 are block diagrams illustrating the arrangements of the direction-finding stations both at the observation station and at points remote therefrom.

Referring to Fig. 5 of the drawings, 100 designates, for example, an airplane or other mobile craft having transmitter means 101 of electromagnetic waves, which waves are designed to be intercepted by sets of direction-finding receiver units 102 and 103, grouped about an observation station 104 remote from the craft. The grouping of these direction-finding receiving units is in accordance with the theorem hereinbefore expressed and is indicated more especially in Fig. 1. In this figure, 105 indicates the vertex of an isosceles triangle, said vertex representing the location of transmitter 101 and the triangle having equal arms 106 and 107 drawn to the diameter 108 of the circle 109 which forms the base of the isosceles triangle on which lies the point 110 as center of the circle.

This central point is the preferred location of the observation station for a group of the direction-finding receiving units, or the observation station may be located at any one of the direction-finding locations. These direction-finding receiving units are to be located on the circumference of the circle or at the vertices of a regular polygon inscribed therein, as indicated more especially in Fig. 2. As therein indicated, a large number of locations for these units 111 with the reception paths 112 are shown to illustrate the principle of operation of the system.

In practice, for purposes of economy and for reasons of simplicity of identification, this large number of stations is reduced to the smallest number that will define a circle and still maintain a reasonable degree of accuracy. A group of three of these units equally spaced has been found to fulfill these conditions, as in the arrangement of the two groups of the units 102 and 103.

A system of distribution such as is shown in Fig. 2 sets forth an ideal system for accuracy because distance measurements taken from any angle of approach of the craft to the center of the circle will be computed from an isosceles triangle, the base of which will be a diagonal of the inscribed polygon of which the radio direction-finding receiving units locations form the vertices 111.

The various degrees of amplitude of the respective received energies from the transmitter are to be retransmitted at radio or audio frequencies to a visual indicator means 113, Fig. 3. This may be accomplished either directly from the output of each receiver unit in close proximity to the observation station, or from the output of each direction-finding receiver at its location some distance from the observation station at which is located in both instances the visual indicator.

Specific forms of the visual indicator means 113 will hereinafter be more fully set forth, together with the representations 114 of effects of the different energies received which are indicative of the direction of the craft from each direction-finding unit. In the combination of these effects, the extreme outer radial lines of the representations 114 form an angle, the vertex of which is at the center of the visual indicator means or screen 113 which angle is indicative of the distance of the transmitter from the center of the polygon. Individual intermediate radial indicia indicate the direction of the transmitter from direction-finding receivers supplying the energy which forms the particular indication.

In the case of the triangular arrangement of receiving stations as shown herein, it is to be again noted that this form is primarily chosen for reasons of practical economy, and therefore departs in some respects from the ideal arrangement; and introduces a calculable error for which correction may be made in calibration. This is done by outlining the paths of approach of a craft to the center of the polygon along some easily distinguishable path. This is shown diagrammatically in Fig. 4, in which the solid lines $a$ represent the approach path or course of craft to center 116 along the median as drawn from each of the vertices of the triangle 117. Diametrically opposite these paths is another set $b$ of three paths which would be identical if the figure were a hexagon.

By providing for identification of these paths on the visual indicator, such as by means of distinguishing line characteristics for determining the 180° ambiguity, the direction-finders normally necessary for producing the actual corresponding indications for the $b$ directions of approach may be eliminated.

Further sets of approaches $c$ and $d$ are indicated by the dotted lines of Fig. 4. Similarly, these dotted lines indicate the lines of approach of a craft to the center of the triangle along a path which is parallel to the sides of the triangle, and afford six new paths, making a total of twelve paths of approach which can be positively identified by distinguishing characteristics of the lines on the visual indications producing them.

Intermediate paths of approach can be identified on the visual indicator as follows:

Separate correction factors are used for the solid and dotted lines of approach, respectively. By observing the relative position of the indicia on the visual indicator with respect to their identification characteristics, the proper correction factor may be used in connection with each indication.

If an indication represents a path of approach along a path intermediate the solid lines $a$ and dotted lines $c$, then the observer judges by eye which path it most closely resembles and refers accordingly to the appropriate correction factor.

Fig. 5 indicates a craft approaching along one of the solid lines $a$ or $b$, and the two outside lines 120 are the two arms of the isosceles triangle referred to in the theorem, with the airplane 100 located at the vertex. The angle formed by the two outside lines 120 of the figure (hypothetical paths of radio reception) indicate a measure of the distance of the plane from the center 104 of the circle of direction-finding units, and the middle line or median 121 of the isosceles triangle indicates the direction of the craft from one of the receiving stations, and because this line also bisects the center of the equilateral triangle formed by the direction-finding stations, this line represents the direction of the craft from the center of the equilateral triangle as well. The angles formed by the lines 120 will gradually become less acute as the craft 100 nears the observation station 104 as indicated in the succeeding representations of Fig. 5, which are correspondingly reproduced on the visual indicator as the image lines 122.

It will be noted that as the craft moves in from long range to short range, the receiving stations 102 are substituted for the receiving stations 103. Corresponding correction factors are used to compensate for the difference between reception angles of receiving stations 103 and 102.

In Fig. 6, the craft is considered to be beyond the effective range of distance but not of direction, and the determinations are made by the group of direction-finding stations 123. The three image lines 124 show on the indicator as being substantially coincident. As the plane approaches along the same course toward the observation station 125, this single line will appear as three lines, as hereinbefore set forth, the two outside lines indicating distance and the angle formed by them gradually increasing as the craft nears the observation point. The middle line, indicating direction, remains in its position as long as the craft remains on course.

To afford different distance ranges, an additional group or groups 126 concentric with the aforesaid group may be alternatively connected to the visual indicator, as hereinafter more fully set forth. It is understood that a corresponding correction factor must be provided for each group on the visual indicator, or a separate calibration scale used.

For measuring extremely short ranges, such as a few hundred yards, or for determining quadrantal direction, the innermost group of direction-finding stations 123 is located as close as possible to the observation point, that is to say, within the same room or within the diameter of a comparatively small circle, for example one of one hundred feet, such as might be found on the deck of an aircraft carrier or on an aircraft itself. This is diagrammatically represented by Fig. 7 wherein 127 designates a group of direction-finding units distributed on the deck 128 in triangular conformation about the observation station 129.

The foregoing descriptions have been confined to measurements in azimuth only, but the novel system is nevertheless suitable for measurements in zenith or altitudinal measurements.

It is, of course, understood that references to zenith measurements indicate measurements in a vertical plane, and this may be accomplished jointly with the measurements in azimuth or horizontal plane.

To accomplish these measurements in a vertical plane, the direction-finding units must be of a different polarization from the group intended for measurements in a horizontal plane, and the transmitting system aboard the craft may be provided with two transmitters of different frequencies, each of different polarization, or alternatively, a single transmitter may alternately energize at the same frequency two differently polarized antenna systems.

For practical reasons the zenith direction-finding antennae are located in the same general plane as the azimuthal antennae, but this is only because of structural difficulties which would be encountered if an attempt were made to place these antennae in a separate, vertically disposed, triangular arrangement. Accordingly, advantage is taken of the fact that all zenith measurements are taken within a small overhead angle, and therefore if the direction-finding units are located in a horizontal plane, two of them will present one side of a vertically disposed triangle to a craft overhead, and the third antennae, which operates for direction-finding only, operates as though it were in an elevated position forming the vertex of a vertical plane triangle.

To obtain distance measurements in zenith over a greater area, it would be necessary to elevate one of the three vertical reception antennae to form a vertical triangle with the other two. This in turn would necessitate a very high mast, and if zenith measurements were to be taken around the horizon, there would have to be either three masts, with provision for lowering two of them when measurements were taken, or to have one single mast in the center surrounded by three triangularly disposed antennae positions, all of which would be very much more complicated and expensive than taking distance and direction measurements in azimuth and only the direction in zenith, as is done with the system herein described. The combination of these two sets of measurements accurately determines the position of the craft in space as regards the earth.

The antenna system on the craft for transmission in a vertical plane for azimuthal measurements may be the usual omni-directional single vertical wire or vertical "fish-pole" antenna having a transmission pattern of 360°.

One antenna for transmission in a horizontal plane for zenith or altitudinal measurements may be the modern "turnstile" antenna employed in television, or a modification of it as shown in Fig. 8, which creates a transmission pattern of approximately 360° in a horizontal plane instead of the directional pattern of the simple horizontal di-pole. A modified form of this antenna may conveniently consist of three horizontal di-poles 130, 131 and 132 arranged as 120° arcs of a circle or as arms of an equilateral triangle, the three antennae being fed in parallel.

The transmitted radio wave employed in the system may be of two general types. The first may be the usual continuous wave, unmodulated at the transmitter. Such a wave is first to be heterodyned at the receiver and the beat frequency thus obtained utilized at the output of the receiver.

If the visual indicator employed is of the mechanical type such as a meter, no further modulation is required.

If the visual indicator is the cathode ray compass hereinafter described, then the preferred method is to apply a second modulator, in the form of a pulse generator, to the output of the receiver for producing a straight-line indication, as hereinafter more fully explained.

The second type of transmitted wave may be the usual 1,000-cycle note-modulated continuous wave, if the visual indicators are of the mechanical type.

If the visual indicator is the cathode ray compass referred to, then the transmitted continuous wave may be modulated by means of a pulse generator located at the transmitter. Thus, reference being had to Fig. 8 of the drawings, the transmitting system shown comprises a vacuum tube oscillator 135 either grid or plate modulated by a neon tube pulse generator 136, fed by means of the manual switch 139 to either the vertical antenna or di-pole 140 or to the horizontal "turnstile" antenna 130—132.

An alternative arrangement is to substitute for the neon tube pulse generator circuit the pulse generator circuit shown in Fig. 8a in which 133 indicates a gas-filled triode, such as the R. C. A. 885 tube, in a sweep circuit of conventional type, as shown in R. C. A. publication "Technical Series T5–2." The connections of transformer 138a may then be substituted for the connections of transformer 138 of the neon tube pulse generator circuit. If plate modulation is used, the output of the pulse generator transformer such as that of transformer 138a is simply substituted for the plate battery 135a of the oscillator 135, as is well understood, and the usual grid leak and condenser is provided for the grid circuit of oscillator 135.

The pulse generator circuit may be of the relaxation type, in which a condenser is charged through a resistance and discharged through a neon tube when the condenser voltage reaches a value sufficient to ionize the neon gas. The grid of the oscillator is given a strong negative bias by the grid battery 141 sufficient to prevent plate current flow. Normally, as no plate current flows, there will be no wave transmitted while the condenser in the relaxation circuit is charging. Upon the ionization of the neon tube, and the consequent discharge of the condenser, a pulse is generated in the circuit having either a saw-tooth shape or a short flat top. One side of the wave is a practically straight line except at the very start of the pulse. This pulse momentarily increases the negative bias on the oscillator but a moment later the negative bias is neutralized and finally a positive bias is momentarily given the grid of the oscillator.

This positive bias permits plate current to flow and oscillations are produced in the transmitting antenna during the period of neutral and positive bias. The wave shape of this transmitted pulse is shown in Fig. 12 or Fig. 12a. The grid cut-off point is determined by the characteristics of the grid voltage curve, and the net result is to produce at the receiver a single pulse, of either flat-top or saw-tooth form, as shown, depending upon the characteristics of the relaxation tube.

Another type of pulse generator for alternative use with the neon generator is the circuit shown in Fig. 11. In this circuit, which may be considered to be of the De Forest self-blocking oscillator type, the grid of tube 142 acquires a positive bias during the interval of feed-back, and the secondary half cycle produces a negative bias and simultaneously charges the grid condenser 143, shunted by a grid leak 144, in a very short time and there follows a very short interval when the tube is inactive.

The grid condenser then starts to discharge in accordance with the grid leak, of relatively high value, and the value of the grid condenser. When sufficient charge has leaked off to produce the proper negative grid bias for the flow of plate current, the feed-back action returns, and the cycle is repeated. The grid resistance 144 of the self-blocking oscillator 142 may be of the variable volume control type, from 0 to 5 or 10 megohms. By varying the resistor, the correct value with relation to the capacity 143 may be obtained for any desired low pulse frequency. In general, the lower the value of leak resistance, the higher will be the pulse frequency.

The wave form of the audio frequency pulse generated by this oscillator is shown in Fig. 11a and consists of a very steeply rising voltage curve indicative of the grid condenser charge, and a practically straight vertical falling voltage curve indicative of the grid condenser discharge. The appearance of the audio frequency wave shape is quite similar to the appearance of the modulation envelope after rectification, which is shown in Fig. 16.

Another type of pulse generator that may be used with the craft transmitter is one which operates on the principle of frequency modulation and is shown in Fig. 8 in the form of a very simple condenser dynamo 150 connected in shunt with the tuning condenser 151 of the transmitter, which may be normally slightly smaller in capacity than that required for the predetermined frequency when this type of pulse generator is used. As the electrode 152 rotates with a shaft insulated therefrom, it comes in close proximity to two extensions 153 and 154 of the tuning condenser plates of condenser 151 and momentarily brings the transmitter into the exact predetermined frequency to which the direction-finding receivers are tuned.

The wave shape of this frequency modulator is shown in Fig. 14.

Still another type of pulse generator is shown in Fig. 9. This is a mechanical type and produces the wave form shown in Fig. 13. In its simplest form, it is an alternating current generator having but a single field pole. In the preferred embodiment, however, a plurality of armature poles 160, 161, 162 and 163 are provided and a unipolar revolving armature 164 of the permanent magnet type is associated therewith. Due to the special shape of the pole tips, the wave shape created takes the form of a substantially straight line extending above and below the zero line, Fig. 13. The modulation envelope of this wave is shown in Fig. 15.

In the combination shown in Fig. 9, the generator is of the polyphase type, two of these phases with corresponding poles 161 and 163 exciting separate transmitters alternately. The net result of this form of pulse generator is to produce at the visual indicator at the receiver a substantially instantaneous view of the effects both of received horizontally and vertically polarized waves. Additional transmitters, if required, may be operated from the extra phases 160 and 162 not in service in the instant embodiment.

It will be noted that the pole tip 163 is of a peculiar V-shape, as distinguished from the cooperating pole tip 161. This characteristic shape of pole tip provides a slight "crook" or dot in the line on the viewing screen, and serves to identify the image thereon produced by the transmitted energy modulated by this particular pole piece, and it may serve to identify either azimuth or zenith measurements. Pole 162 is indicated with its tip provided with a modified surface, as indicated, to identify other transmitters, if utilized.

Thus, the principle of phase distribution may be extended if desired, for example by the use of a pulse generator of more than two phases to modulate correspondingly different circuits in sequence.

Additional transmitters 160' and 162', if desired, may be operated from the extra pole coils 160 and 162. These extra transmitters may each be of the same frequency and polarization as either transmitter 165 or 166 and may be grouped therewith in triangular arrangement on the craft, whereby distance-finding signals may be transmitted from three locations on the craft in triangular formation.

The energies developed at the poles 161 and 163 are applied alternately through corresponding transformers 167 and 168 to modulate respective transmitting circuits 169 and 170 of different radio frequencies. One 2 mc. frequency is transmitted as horizontally polarized waves from antenna 165 and the other as vertically polarized 1 mc. waves from antenna 166, as an example.

If instead, the pulse modulator is used at the receiver, as shown in Fig. 10, a special combination of two such generators 175 and 176 operating in synchronism is provided to simultaneously modulate the outputs of two separate receivers 177 and 178, after the inputs of these receivers have been heterodyned by a local oscillator 179. The two generators are connected by a single insulated driving shaft 180 to insure an anticapacity connection from each generator to the output of the corresponding receiver, since it is important that one receiver shall not in any way affect the other.

The beat frequency obtained from the local oscillator and the received wave should preferably be high, for example, 3,000 cycles. The output energy from each receiver is first put through respective output transformers 181 and 182 to provide for rectification through the grid-controlled rectifier tubes 183 and 184, the grids of which are normally provided with a strong negative bias, from the batteries 185 and 186, sufficient to prevent plate rectification in the tubes.

Without the pulse generators, the two receiving circuits do not deflect the spot of the cathode ray tube 187 as no rectified current from the received beat frequency can pass through the rectifiers, owing to the negative bias of both of these tubes.

With the pulse generators connected to the grids of these rectifying tubes, as shown, however, the grid negative bias is first neutralized by the negative half of the pulse wave, and then made positive by the positive half of the wave. The voltage of the pulse generator as in the case cited with the pulse generator at the transmitter, may be greater than the voltage of the negative grid bias supply.

When the grids of the rectifier tubes become neutral or positive, plate current in the form of output currents from the separate receivers may flow, and therefore during the time interval in which the pulse generator is active, a very brief pulse of output current from the receivers is allowed to pass.

The net result of this method of receiver modulation is to produce on the cathode ray tube screen 188 a straight line 189, which is indicative of the wave form of the pulse generator after rectification. The wave shape of the rectified pulse as applied to the deflectors of the cathode ray tube is shown in Fig. 16 and it will be observed that this shape is indicative of direct current only, half the pulse generator wave being lost in single rectification. It is this final form of received energy that moves the cathode ray spot.

The frequency of the pulse generators is of great importance. It must be low enough in all cases to permit the spot to return to the center of the screen after each deflection, whether this deflection is produced by deflectors of the electromagnetic or electrostatic type, that is, coils or plates.

This means that the time constant of the spot as determined by the values of capacity and resistance shunting the deflectors must be such with relation to the frequency that the condenser is allowed sufficient time to completely charge and completely discharge between each pulse. I have found that a very satisfactory pulse frequency is fifteen per second, when used with cathode ray screens of medium persistence.

With screens of long persistence, pulse frequencies as low as two or three per second may be used. The timing of the pulse with relation to capacity and resistance is very critical, as it determines how much "center spot" shall appear on the screen, and whether the "center spot" will really be in the center of the screen or slightly shifted from center during the reception of signal energy, which condition would be fatal to accuracy.

The best conditions are such that the "center spot" is clearly defined as a dot of medium brilliance in the center of the screen but does not show halation or "sunburst" which would indicate too long a period between pulses or too low value of capacity and too low value of resistance. No "center spot" at all indicates too high a pulse frequency or too high value of capacity and of resistance.

I have found that with a pulse frequency of the order of ten per second, a satisfactory capacity for the condensers 190 and 191 shunting the deflector plate may be of the order of .011 mfd. and the variable resistors or volume controls 192 and 193 shunting this capacity may be of the order of 0 to 1 megohm. By varying these resistors, the speed of the spot to and from the center of the screen may be controlled. For example, if it is desired to produce a brilliant center spot, indicating high spot-speed with a comparatively long idle period during which the spot does not move, and hence causing a well-defined spot in the center of the screen, the volume controls 194 and 195 are adjusted for comparatively low resistance, such as 250,000 ohms each. It is important that both these variable resistors in addition be adjusted to compensate for any phase difference, in order to maintain a straight line. This adjustment is usually very slight, being but a small proportion of the adjustment required for different spot speeds.

If it is desired to eliminate any center spot but to bring the signal lines to a neat vertex, the resistors should be increased, for example, to 400,000 ohms or to that value of resistance that will produce the desired effect.

The output transformers from each receiver to the corresponding rectifiers and deflector plates may conveniently be of the step-up type, that is, delivering a voltage increase from the receiver to the rectifier and have a 1-to-3 ratio or higher.

The rectifiers in series with the deflector plates should preferably be of low impedance triodes such as the R. C. A. 885, which is suitable for grid-controlled rectification, or the R. C. A. 30 battery triode, suitable for simple rectification with grid and plate strapped together as is common practice. Battery-heated rectifiers such as the 30 tube prevent line capacity effects. If the impedance of the rectifier is too high, the cut-off will be unsatisfactory and the resulting image distorted.

The wave shape of the pulse generator containing iron, i. e. the small machine of Fig. 9, is very critical, in that the disposition of the pole pieces and their shape determine the course of the spot in producing a line. For example, if the wave form is delineated in the usual manner of a sine wave trace from pole pieces in close proximity to one another, it will be found that adjacent voltage curves merge, and a smoothing-out effect exists to produce the resultant. This is the reason for widely separating the poles of the pulse generator. They are placed so far apart with relation to the area of their pole pieces that no interaction or merging effect is apparent and each pole produces a sharply rising voltage curve uninfluenced by its neighboring poles.

The direction-finding antennae employed with the system may be either the type known as "crossed-loop," characteristic of the Watts cathode ray radio compass specifically described in U. S. Patent No. 2,170,835 issued to Emil Simon, in connection with a direct-reading radio compass, or they may take the form of Adcock antennae, specifically described in the U. S. patents to Sullinger et al. No. 2,174,014 or to Heller No. 2,202,552, both of which patents describe the antennae in connection with direct-reading radio compasses, and no novelty is claimed for these antennae per se.

The type of antenna is influenced by the receiver frequency employed. If the frequency is in the 300 to 600 kc. band, crossed loops are preferable as they are more easily constructed and maintained. For the higher frequencies, Adcock antennae are to be preferred to counteract to so-called "night effect" as is well understood.

For receiving the transmitted impulses, two complete sets of Adcock antennae or two complete sets of crossed loops are mounted at each direction-finding station in close proximity, either in non-inductive relation or sufficiently far apart to prevent one set from affecting the other electrically. One of these sets of antennae is for the reception of vertically polarized waves and one set is for the reception of horizontally polarized waves.

The distance of these antenna locations from the central or observation point depends upon the range to be covered, as hereinbefore described, and the received energy from the direction-finding antenna may be retransmitted to the observation point over conductors at either radio or audio frequencies. The choice of frequency at which the retransmission takes place over conductors is determined largely by constructional difficulties and economy.

If the retransmission is to take place at radio frequencies over conductors, it is necessary to use either coaxial cables or transposed feeders, both of which are comparatively expensive and difficult to maintain and should preferably be confined to distances not greater than one mile.

On the other hand, if the retransmission takes place at audio frequency, ordinary telephone cables may be used, preferably, but not necessarily, underground. This latter form is much less expensive and, in addition, offers less transmission difficulties. In the former instance the radio receivers may be located at the observation station.

Another system of retransmission is to employ radio transmitters and retransmit the received energy over radio channels.

A convenient way of doing this is to "televise" a pictorial representation of the direction indications to the observation station.

The position of the direction-finding antennae with relation to the points of the compass may be as follows. For the ordinary observation of swiftly moving craft, the antennae, whether crossed-loop or Adcock type, once fixed in position, need not be shifted, although for greater accuracy they may all be oriented to a predetermined position, as hereinafter explained. The position of each direction-finding antenna relative to the others of the group is preferably determined as follows.

There should be some one geographical or stellar point with which to align each antenna or set of antennae. The most common of these is the North Pole, and the crossed loops or crossed Adcock antena from which azimuthal measurements are to be made are very easily oriented until a median of the pairs of the respective loops or arms point due north and south. The fact that the meridians of longitude taper toward the poles is insignificant owing to the great distance usually intervening between the pole and the location of the system.

When all the azimuthal direction-finding antennae are so positioned, each may receive from all directions, and the relative intensity of the received energy in cooperative relation with the identifying characteristics of each direction-finding antenna will provide at the visual indicator an indication of the respective reception paths of each antenna from the transmitter.

In the case of the horizontally polarized or zenith antennae, these are aligned in the same general manner as the azimuthal group, but with a different standard of comparison, namely: the center of gravity or a plumb line.

In addition to this alignment in a vertical plane, the zenith antennae are also grouped with the horizontal di-poles forming one side of a polygon as shown in Figs. 28 and 28a. It is to be noted that both zenith or azimuth antennae are aligned in fixed relation to each other, and that the median of the antenna arms is in line with the center of gravity, as shown.

In the latter arrangement, they may be located at the direction-finding stations which may be at much greater distances from the observation station, for example five miles, since audio-frequency transmission offers no special problems for that distance. In general, it may be said that the twenty-to-one ratio mentioned in my aforesaid U. S. patent may be used to govern the range over which distance measurements are to be taken. As an example, if it is required to measure distances of the order of twenty miles, the direction-finding stations may be placed approximately one mile apart. Much depends upon the discriminating characteristics of the visual indicator, as will be later explained.

The reason for orienting all of the azimuthal antennae to a position approximately in line with the craft transmitter, is as follows.

As the antennae are primarily located, that is, with a median of one of the pairs of arms pointing at the North Pole, they are, strictly speaking, capable of accurate reception from craft in a northery direction only from the observation station. To this, of course, may be added the 180° opposite or due southery direction. This is because for greater accuracy identical sections of the same quadrant of the crossed loops or antennae must receive the craft signals. Therefore, if a craft arrives from the east or west, it will be received over a different sector of the earth's surface and by a different section of the loop or antenna quadrant which may introduce slight errors in the measurements, since a polar diagram discloses that crossed loops or antennae do not discriminate direction along a linear curve.

To avoid this error and to insure greater accuracy, each set of azimuthal direction-finding antennae may be oriented about a vertical axis to a position where all are similarly "aligned" with respect to a point at an infinite distance from the observation station and in the general direction of the craft.

The arc of this orientation is very small, being only 30° either side of the normal position, i. e., that in which the antennae are aligned with the North Pole.

A representation of this orientation is shown in Fig. 17 in which 200 represents a vertical supporting spindle for the cross-arms 201 of the Adcock antennae 202, 203, 204 and 205 with their respective adjustable telescoping inductances 202', 203', 204' and 205'. It is to be understood that the cross-arms are shielded supports only and play no part in radio reception, this being differentially effected by the vertical rods or antenna, the feeder cables to these arms being inside the hollow cross-arms.

A socket or bearing 206 supports for rotation the vertical spindle 200 and a stop pin 207 limits the arc of orientation by contact with an arcuate abutment 207'. A retractile spring 208 attached to the spindle normally holds the cross-arms 201 in a position halfway between either abutment limitation.

A local oscillator or signal generator 210 is indicated with vertically polarized antenna 211 and key 212 permanently fixed to the vertical spindle by a bracket 213 for testing purposes, as hereinafter described. The cross-arm structure is affixed to the shaft at right angles thereto and two solenoid plungers 214 and 215 slide horizontally through solenoids 216 and 217, respectively, each plunger being flexibly connected to the cross-arm structure.

A battery 220 or other source of current is provided with one of its terminals grounded and the other connected to the arm of a two-point switch 221, the terminals of which are adapted for contact alternatively with said arm and are connected with one terminal of either solenoid, the remaining terminals of the solenoids being connected to a common ground 222.

Throwing the manual switch 221 will thus energize one of the solenoids and deenergize the other, with the result that the entire antenna structure is oriented to either side of its normal position to the position shown in dotted lines, to the limit of the abutment, making a total arc of 60°. This is sufficient to align approximately the antenna with a craft approaching along any one of the twelve paths previously referred to, and as hereinbefore explained, provides reception in the same section of each quadrant of the antenna. When the switch 221 is open, the cross-arm structure, under the influence of the retractile spring 208, reverts to the normal position indicated by the full lines.

Fig. 18 indicates diagrammatically an antenna array, all designed for measurements in azimuth at various elevations. The outer circular arrangement or triangle of direction-finding stations 225, 226 and 227 is for determining distance in azimuth, while the inner circular arrangement of closely grouped direction-finding stations 228, 229 and 230 is for the determination of direction and corresponding earth quadrantal discrimination. An aircraft 231 is shown at various elevations at the vortex of each triangle formed by hypothetical lines 232, 233 and 234 or direction paths to each direction-finding station. This aircraft is equipped with a vertical antenna 235 and the direction-finding antennae (not shown) at the vertices of the ground triangle stations are also to be vertically disposed.

Midway along the direction paths indicated by the hypothetical lines are shown identifying indicia in the form of a solid line, dashed line. and dotted line portions. These are shown purely as imaginary lines on the drawings to illustrate the method of identification.

Craft position A indicates a craft approaching the observation station 240 along a plane close to and nearly parallel to the earth, and the lines 232, 233 and 234 indicate the relative positions of the direction reception paths to the direction-finding stations 226, 225 and 227. The visual indicator in this case is a cathode ray screen 240a, Fig. 19, with the three corresponding indicia 232', 233' and 234' produced thereon, each with its identifying characteristic, as hereinafter set forth.

It will be noted that identification marks used for zenith readings in addition to those shown are absent in this figure, because only the method of determining azimuth measurements is illustrated.

Craft position B indicates the same craft at a slightly higher elevation, and the lines to the closely grouped direction-finding stations 228, 229 and 230 in the center of the outer group of direction-finding stations indicate that absolute direction or direction from the observation station is being determined, with the quadrantal indicia appearing on the hypothetical direction line paths.

The images on the cathode ray screen 240b, Fig. 20, of the indicia are shown indicative of absolute direction and corresponding quadrants with respect to the center of the direction-finding group and these, due to the close grouping of the direction-finding stations of this group, appear as the three lines 232', 233' and 234' almost parallel and very close together. This is assuming that the craft is within the distance range of the outer group of direction-finding stations. If the craft should fly very close to the observation station or more closely grouped direction-finding stations, say a few hundred direction-finding lines shown as very close together for long distances become widely separated, and a determination of very close distance range may be made as well as direction.

Craft position C, Fig. 21, shows the craft at a still higher elevation with the cathode ray images depicted on the screen 240c.

Craft position D, Fig. 22, shows the craft on the borderline of azimuth and zenith readings as indicated on the screen 240d. There should preferably be a slight overlap on the calibration scales, hereinafter disclosed, of readings of distance for azimuth and zenith.

The line of demarcation is not definite, but in general azimuthal distance measurements should be taken as long as good field intensity prevails. As the craft enters the zenith, the vertically polarized waves decrease in intensity compared to the same distance in space horizontally; therefore the image lines on this cathode ray screen become shorter until, when the craft is exactly overhead in zenith, no energy can be received by the vertically polarized antenna. This is the reciprocal or inverse illustration of the well-known "blind" or "dead" area over a vertical transmitting area. Before this point is reached by the craft, azimuthal measurements should cease, and zenith or altitudinal measurements begun, as shown in Fig. 24.

For the azimuthal measurements a horizontal median 241 of the crossed pairs of di-poles, or Adcock antennae, 242 and 243, Fig. 23, may be normally aligned with the geographical north. For greater accuracy, this alignment may be made approximately with the craft, by orienting the di-poles by remote control as hereinbefore described.

In Fig. 24 are shown three positions of the craft 250 in zenith for altitudinal measurements from an outer circle of direction-finding stations 251, 252 and 253, with horizontal polarized antennae indicated in Fig. 28. Similarly, a vertical median 254 of the crossed pairs of horizontal di-poles 255 and 256 is to be oriented, in this instance not to the geographical north but to the center of gravity or aligned with a plumb line. The first position shows hypothetical direction-finding reception lines 257, 258 and 259 of horizontal polarization from the horizontal "turnstile" antennae 250', 250" located preferably though not necessarily under the fuselage of the craft. These lines, as in those for azimuthal measurements, are identified by the same earth quadrant identifying means but in addition they are also supplied with polarization identifying means, which appear in the indicia on the cathode ray screen as small "kinks" 260 or variations in light distribution of the line, caused by the pulse generator characteristics for zenith modulation, as hereinbefore explained. These "kinks" or dots of light deformities are not detrimental to accuracy since they are very slight and are not located on the calibration scale. For purposes of illustration, they are exaggerated.

Craft position E indicates a craft on the borderline between a position for azimuth readings and one for zenith readings. As before explained, this position is not a very definite one and is satisfactory if sufficient vertically polarized energy can be received to permit both azimuth and zenith readings. The indicia 257' and 258' are shown on the cathode ray screen 240e, Fig. 25, for distance measurements in zenith.

Craft position F shows a craft nearly directly in zenith and the hypothetical identifying lines show that direction is being determined from the inner circle of horizontally polarized antennae 261, 262 and 263. The indicia on the cathode ray screen 240f, Fig. 26, appear as three lines 257', 258' and 259' almost merging into one with only two space quadrantal characteristics being used instead of four, as in the azimuthal direction-finding indicia, and the identifying mark or "kink" in the lines appears, denoting zenith transmission and reception.

As in azimuthal direction-finding, distance may also be measured from the inner group if the craft approaches to within a few hundred yards of the observation station in the zenith.

Craft position G shows the craft directly overhead in zenith, with the hypothetical identifying lines 257, 258 and 259 showing the paths of direction-finding reception to the direction-finding stations 251, 252 and 253 and space quadrantal identification. In this particular position of the craft, it is, of course, immaterial whether the quadrantal identifying lines appear or not and the angles of the three lines 257', 258' and 259' are shown on the cathode ray screen 240g, Fig. 27.

Assuming that by the central indicia or middle line on the cathode ray screen it has been determined in what azimuthal quadrant or 120°-sector of the earth's surface the craft is located, as hereinafter more fully explained, there is still a 180° ambiguity, that is, it is not known whether the craft is in one direction, as shown by one of the indicia on the cathode ray screen, or in a direction exactly opposite.

One method of overcoming this 180° ambiguity is shown in Fig. 29, in which 270 represents a triangle corresponding to the placement of the direction-finding units 271, 272 and 273. A combination of angles 274 and 275 serves to illustrate an hypothesis useful in overcoming the 180° ambiguity in the following manner. At each vertex of the triangle 270 a direction-finding station is located, and at a vertex 276 or 277 of either of the hypothetical angles 274 and 275 a craft 278 may be located. If the craft is located at the vertex 276 of the hypothetical angle 274, then it will be nearer to the direction-finding unit location 272 than to either direction-finding unit location 271 or 273, the paths of direction-finding reception being indicated at 272', 273' and 274'. In accordance with the transmission attenuation law, therefore, the received energy will be greater from the location 272 than from the locations 271 or 273, and the result on the cathode ray viewing screen 280, Fig. 30, will be three lines or indicia 281, 282 and 283 juxtaposed to a scale 284 and indicative of signal intensity. The central line 282 will indicate the energy received from direction-finding unit 272 and the two outside lines 281 and 283 will be indicative of signal energy received respectively from direction-finding units 271 and 273.

The central line 282 which is the result of the energy received along the reception path line 272' will be the longest of the three as it is the result of the greatest received energy and indicates that the craft is in the quadrant or sector of the earth in which the direction-finding station 272 is located, considering the center of the triangle formed by the three direction-finding stations as the point from which direction is taken. This point is preferably made the observation station 285 and the control apparatus (not shown) is to be located here as well as the most closely grouped direction-finding units.

If the craft is in the opposite quadrant or earth sector, then it will be farther from the direction-finding unit 272, as indicated along the reception path line 286, Fig. 31, than to either direction-finding unit location 271 or 273, the paths of direction-finding reception of which are indicated at 271'' and 273'', respectively. The appearance on the cathode ray screen 280 will be three lines, the two outside lines 281 and 283 and a middle line 282 which will be shorter than the outside lines. This is due to the fact that it is indicative of the signal energy received by direction-finding unit 272. In this case, because the distance is greater from this unit to the craft than from direction-finding units 271 and 273 to the craft, the energy received from direction-finding unit 272 will be less. This method of deciding the 180° ambiguity is useful for comparatively short ranges.

The comparison of line lengths may also be used advantageously to measure distance at close range, as follows. The length of one of the signal lines is brought by means of an amplifier attenuator to a predetermined radius, and the length of one of the other lines is compared therewith, the difference in the line length indicating the distance between craft and a predetermined direction-finding station. When the distances to be measured are too great for discrimination between line lengths, then a second method of deciding 180° ambiguity may be used.

Referring to Figs. 33 to 35, the same set of triangles will be noted as were indicated in Figs. 29 and 32, with craft 290 located either at the vertex 291 of the angle 292 or at vertex 293 of the angle 294. The direction-finding stations, three in number, to wit: stations 295, 296 and 297, are located at the vertices of an equilateral triangle similarly to the arrangement hereinbefore described and with the base 288 common to the two angles 292 and 294, which forms therewith two isosceles triangles, extending to the opposite sides of said common base. The observation station 299 is located at the center of the receiving stations triangle. The vertices 291 and 293 represent points equidistant from the base but not from the center of the said triangle.

To facilitate comparison of angles for illustration, the arms of the two direction-finding station antennae 295 and 297 are extended as at 295', 295'' and 297', 297''.

As hereinafter more fully explained, the novel type of cathode ray radio compass employed utilizes the usual crossed loops or di-poles as direction-finding antenna. For simplicity of illustrations, loops are used as examples. Each half or single loop feeds received energy from a common radio transmitter (not shown) such as on the craft 290. This received energy is fed to one set of deflector plates of the cathode ray tube, and the combined result of the effects of the energy received by two loops on the viewing screen 300 is as follows.

The solid line 301 will appear on said screen to cooperate with a scale 302 and to register with the reference line 303. It indicates the direction of the craft from the observation station 299 because the identifying characteristic (solid line) represents the quadrantal location but with the 180° ambiguity undetermined. This registration with the reference line merely indicates that the craft is in equi-signal relation to the crossed loops of station 296.

The relative position of the two outside indicia lines 301'—315 and 301''—316, which are indicative of the energy received from the corresponding direction-finding stations 295 and 297, is the determining factor in deciding the 180° ambiguity, while the angle between them determines the distance. At infinity, these outside lines on the viewing screen would appear as one line coinciding with the line 301, and at infinity the 180° ambiguity cannot be determined.

As the distance between the observation stations and craft becomes less, however, these outside lines begin to spread apart indicating the reception line paths 305—311 or 310—312, while the relative position of reception path line 317 or 317' remains unchanged. The line 315 appears at the left of line 301 and line 301' appears at the right when craft 290 is at vertex 291. Considering the position of line 315, for example, with relation to the line 301, it will be either to the right or left of this line depending on which loop of the pair of direction-finding loops 295 is receiving the preponderance of energy. If both loops 295' and 295" of the pair were to receive equal energy, as at infinity, then there would be no angle between lines 315 and 301.

Since at distances less than infinity, one loop of a pair receives more energy than the other, an angle will be formed between these lines. In this instance, loop 295" of the pair 295 receives more energy than loop 295', as shown by the hypothetical reception path line 305 which is closer to loop 295" than to loop 295', and therefore has a tendency to pull the line 315 on the screen, which represents its energy, away from the line 301, in the direction determined by the deflection characteristic of its associated deflector, for example, to the left of line 301. Similarly, when the craft is positioned at the vertex 293 by tracing the reception path line 310 with relation to its proximity to one or the other of the pairs of loops 295, it is found that with the craft position at vertex 293, the reception angle path line 310 runs closer to loop 295' than to loop 295", thereby causing a reversal of line position 315 with relation to line 301, it now being pulled to the right of this line as shown at 316, Fig. 34, and is identified by its identifying characteristic (dotted line). This shows that the craft is in the diametrically opposite azimuthal sector from what it would be if the same indicium appeared at the left of line 301, Fig. 35.

Line indicia from either cross loops of station 295 or of station 297 may be used in deciding this ambiguity. The result will be the same, namely: that with the craft at vertex 293, the indicia lines will be in reversed relation to line 301 from what they would be if the craft were at vertex 291.

In Figs. 36 to 38 are shown three zenith direction-finding antennae 320, 321 and 322 viewed from a position approximately in line with the horizon. Craft in the position of vertex 323 produces on the screen 324, along the paths of direction-finding reception indicated at 325, 326 and 327, the lines 325' and 326' relatively close together, with line 327' relatively far apart from either. Craft in the position of vertex 328 produces the indicia lines 325' and 326' on the viewing screen as lines close together and the line 327' relatively distant from either but upon the opposite side of the screen.

In the foregoing arrangement, the fact that two of the indicia are close together and the third comparatively widely separated from them indicates that the craft is over an earth sector the vertex of which is also the widely separated vertex of the triangle formed by the direction-finding stations 320, 321 and 322. In the example shown, this would be direction-finding station 320, since the widely separated solid line 327 from the craft 328 terminates at 320. It is assumed that by calibration it has been predetermined that when craft approach is from the angle shown, the characteristic of the widely separated line to the right, in the present instance that of the solid line, controls the earth sector.

It is obvious that the widely separated line to the left of the other two might also be used, in the negative sense, by denoting that the sector it represents is the sector over which the craft is not flying.

When the position of the craft is such that there is even spacing between the indicia on the screen, an alternative method somewhat similar to that used for 180° discrimination in azimuth may be employed. Obviously, there is no 180° ambiguity in true zenith measurements; therefore, the error is purely a quadrantal one. When a craft is in such a position that the three indicia on the screen are evenly spaced, the earth sector and consequently the air space sector over which the craft is flying may be determined by the characteristic of the middle line.

By associating the characteristic identifying indicium of the middle line on the screen with the earth sector or geographical location of the direction-finding station receiving this indicium, the craft may be located as follows.

The direction-finding station with which the middle indicium is associated will form a vertex of the earth sector or quadrant over which the craft is flying. This vertex will be the one nearest the observation station. A median drawn from this vertex and bisecting the observation station will then approximately intersect the craft, if drawn to its elevation. In other words, the craft will be on the diametrically opposite side of the observation station from which the identified direction-finding station is located, and at a different elevation.

In addition to all indicia for earth quadrantal discrimination, whether for direction or distance measurements, there may be the zenith identifying characteristic such as the "kink" 329 or different light distribution hereinbefore described to distinguish zenith from azimuthal measurements. The calibrated scale of each determines by its indicia engraved thereon the positions of the craft relative to the geographical location on a map, as hereinafter more fully explained.

I have found that after a little practice it becomes possible to gauge accurately the angles shown on the calibrated scale by eye, in much the same manner as one tells time by glancing at the face of a clock, even though there are no figures on the dial. This feature is of great value when working with swift craft at close range, where there is only a fraction of a second to determine readings, and proficiency in judging these angles is acquired more readily than, for example, learning the Morse code.

In addition to the determination of craft position in space, the flying position of the craft may also be observed. For example, if the craft makes a steep bank, both azimuthal and altitudinal signal lines on the screen suddenly take a sharp "dip," that is, the lines suddenly shorten. If the plane suddenly "zooms," the altitudinal or zenith indications remain constant in length but shift their angle. If the craft dives, the same effect is seen on the screen but the shift of the indicia is in the opposite direction.

When visual indicators other than cathode ray tubes are employed in the system, for example, indicators of the meter type for a single needle direct-reading radio compass, such as shown in my U. S. Patents Nos. 2,255,659 and 2,284,812, or those known as the Sperry R. C. A. automatic D/F radio compass (catalog No. 15-75B, September 1938) may be used. The former may be used in much the same way as cathode ray tube indicators, and the latter will be presently described, but indicators of this latter type are not adaptable to the re-transmission of their indications in the same manner as cathode ray tube indications, as shown. Such a radio compass, which is described in the said catalog No. 15-75B published by The Sperry Gyroscope Company in 1938, consists of a slowly oscillating Kolster single loop, with pointer or needle attached and therefore moving over a scale in synchronism with the loop.

When the loop arrives at a position at right angles to the path of minimum reception, the pointer stops and registers the direction of the transmitter. In Fig. 39 at 330, 331, and 332 are shown diagrammatically such radio compasses, one at each direction-finding location.

A craft 333 transmits a signal, vertically polarized for example, which is received by each radio compass from a different angle, or direction-finding location, along the paths 334, 335 and 336 indicated. A complete television receiver 340 with cathode ray screen 341 and receiving vertical dipole 342 is located at the observation station 343 and tuned to the frequency of the three complete iconoscope television transmitters 344, 345 and 346. Each of these iconoscopes scans the actual direction-finding dials 347, 348 and 349 with pointer indicator and transmits the effects to the corresponding vertical transmitting di-poles 350, 351 and 352, when the contact-making relays 353, 354 and 355 are operated.

The transmission is effected by means of a rotating cam switch 356 from the battery 356' which energizes said relay in sequence upon closing the respective relay circuits at the contacts 357, 358 and 359. This has the effect of transmitting from the di-poles 350, 351 and 352 a brief "view" of the pointer positions 347', 348' and 349' of each radio compass on the screen 341. The speed of the rotating cam switch 356 is sufficient to produce persistence of vision on the screen and each transmission from the respective direction-finding station may be considered to constitute a single frame. The result is a picture 341' on the screen of the three superposed radio compass pointers located on the screens 347, 348 and 349, respectively.

The frequency of the television channels is preferably made widely different from the frequency of the craft transmission.

Zenith indications may be carried out in the same general manner, as is well understood, and oscillating di-poles may replace the loop of the Sperry R. C. A. compass.

In deciding what type of radio compass is to be used at the direction-finding stations, the expense of three complete television transmitters and one complete television receiver is to be balanced against three transmission cables, either ordinary cables or those of the coaxial type. Each type has its advantages and transmission over the air by television for distances greater than two or three miles may sometimes prove to be the most economical method.

The cathode ray radio compass described herein is particularly adaptable to reception of direction-finding energy from a plurality of direction-finding stations because it is operated by the differential effect of the transmitter on two channels in which low frequency or direct-current pulsations are employed, both of which are comparatively easy to transmit by metallic conductors over medium distances.

Where metallic conductors are used to retransmit the energy received from the craft to the observation point or control room, these may be of two general types.

If the received signal energy from craft is retransmitted at audio frequency currents to the control station, as shown in the system herein described, well-designed, matched impedance, telephone cables may be used.

If the received signal energy from craft is retransmitted as received at radio frequencies, then coaxial cables should be used, as is well understood in television practice.

The use of coaxial cable for the retransmission of radio frequencies as received has the advantage that all receivers and testing apparatus may be located at the control station and only the antennae at the receiving stations, thus making an attendant at each direction-finding station unnecessary.

A preferred construction of each receiving station is to place all apparatus including the rotatable crossed antennae in a small building shielded from the weather with all transmission and control cables leading to the observation or control station in underground conduits.

In large airports of principal cities where expense is not as important as at the smaller airports, an attendant may be in charge at each of the three direction-finding stations and another at the control station. Telephonic communication by land wire or radio is to be maintained between the control station and the direction-finding stations at all times.

With an attendant present at each of the direction-finding stations, tests may be conducted by the attendant, as hereinafter more fully described, and the results communicated to the control station where the operator there may compare and check the various testing results obtained. Where the system is installed at the boundaries of a landing area for seaplanes, it is obvious that the control room or observation station may not be placed underground or afloat in the center of the area, owing to the possibility of accidental collision by landing craft. The direction-finding stations, obviously, may be located on floats or barges.

Under these circumstances, the observation or control room may advantageously be placed at one of the direction-finding station locations or immediately adjacent thereto. The conductors for the retransmission of energy from the direction-finding stations to the control room may conveniently be submarine cables of matched impedance. Alternatively, the communication means may be television channels, as hereinbefore described.

One of the simplest forms of simultaneous viewing visual indicators is the combination shown in Fig. 40. As illustrated therein, a special type of sensitive zero-center, self-rectifying microvoltmeters 360, 361 and 362 are grouped in triangular formation, with their indicating needles 360', 361' and 362' directed toward the center of the group, as shown, for simultaneous viewing. From the direction-receiving stations 363, 364 and 365 connection is made to the respective meters located at the observation or control station 366 by duplex cables 367, 367', 368, 368' and 369, 369'. Three suitable scales 370, 371 and 312 are provided, one for each meter, as shown. The scales 370 and 371 are calibrated in degrees and correspond to units of distance, a certain number of degrees representing a unit of distance, such as a mile, while the scale 372 is calibrated for direction. A reference line 370', 371' and 372' is provided, respectively, in the middle of each scale of a distinctive color.

The three meters are connected with reference to their polarity to the outputs of three sets of receivers 373, 374 and 375, a received signal by all three causing corresponding deflections of the respective needles. Needle 360' is designed to swing to either side of reference line 370'; needle 361' to either side of reference line 371'; and needle 362' to either side of reference line 372'— the ends of all needles being extended substantially to the edges of their respective scales. With the arrangement indicated, the meters 360 and 361 are suitable for distance determination and the meter 362 for direction determination.

The needles of each meter may conveniently be painted a distinctive color, such as white, red and blue, and each colored needle is used to denote the direction-finding station from which it receives its indications.

By judging by eye which needle is nearest its reference line in the middle of the scale, the earth sector or quadrant over which the signal is arriving and in which the craft is located may be determined. This is done by associating the meter needle nearest its reference point with the associated direction-finding unit location, and it will be found that this will be the unit more nearly in line with the craft.

There remains the 180° ambiguity and this may be determined by disconnecting one of the receiver output connections of each meter, which allows the meter to then act as a simple attenuation indicator.

The meter needle showing the greatest deflection on its scale is the one associated with the direction-finding unit nearest the craft, and hence indicates the earth sector in which the craft is located.

Another form of simultaneous viewing of the directional effects of received craft radio signals is to employ separate cathode ray tubes, each with separate deflectors and screen, and to energize individually the deflector system of each tube by means of the retransmission of directional effects of each direction-finding unit to its respective tube. Several variations in the distribution and grouping of such cathode ray tubes, as well as variations in screen shape, are shown in Figs. 41, 42, 43 and 44.

In Fig. 41 three cathode ray tubes 380, 381 and 382 are represented as closely grouped, with their respective screens 380', 381' and 382' in juxtaposition. The directional antennae 383, 384 and 385 of the novel system are arranged in triangular formation about an observation station 386, one pair at each location, each pair with its associated receivers 387, 388 and 389. Duplex cables or transposed transmission lines 390—390', 391—391' and 392—392' connect the outputs of the respective receivers to the deflector systems 393, 394 and 395 of the tubes. The tubes are grouped with respect to their deflecting characteristics as follows, reference being had more particularly to Fig. 43.

The screens 380', 381' and 382' of all three tubes are located in the same plane, and the axes of the tubes are parallel, each screen being provided with a corresponding scale 400, 401 and 402 graduated in degrees of a circle (120°) the midpoint of which in each case may constitute a reference point. When equi-signal indications appear on each screen, the particular indicium for that tube should extend from the center of the screen to the corresponding reference line, when grouping the tubes. The three tube screens are grouped with two side by side with the third juxtaposed thereto. This makes a triangular grouping of the screen centers of the tubes. The directional indication 400', 401' or 402' on the screen of each tube is a straight line, starting at the center and extending radially toward the circumference of the screen scale. The position of each tube screen relative to the others is such that the active quadrant, that is, the quadrant of the screen wherein the screen image appears, is the quadrant facing the center of the group, the vertex of the angle defining the screen quadrant being the center of each screen.

Thus, the screen center of all three active quadrants form the vertices of an equilateral triangle. The scales being common to two of these directional indication lines, distance may be read from the scale calibrations included between such two indicia.

When an equi-signal is being received, that is, one which affects both halves of each direction-finding system equally, these signal lines assume the position just mentioned, namely on the reference line. This occurs when the transmitting craft is at a great distance (infinity) and in line with a median drawn from one direction-finding station as a vertex to the midpoint on the arm of the opposite side of the triangle formed by the direction-finding stations, as described hereinbefore.

At all other distances these lines assume various positions relative to the reference line, depending upon the polarity of the energizing currents fed to the deflector plates, and upon the degree of angular reception of each direction-finding unit.

For measurements over the four quadrants, this tube and screen combination is utilized to determine over which quadrant of the earth's surface the craft is located, as follows:

By glancing at the group of screens, it is easy to determine by eye which signal line is nearest its reference line. When this has been decided, it is only necessary to refer to the direction of the direction-finding station associated with this screen line to determine that the craft is either in line with it or approximately so, thus defining the earth quadrant with the exception of the 180° ambiguity hereinbefore described. This ambiguity is overcome by deciding which of the three signal lines appearing on the three screens is the longest. The screen showing the longest signal line will be indicative of the direction of its associated direction-finding station and therefore indicative of the craft position relative to the 180° ambiguity, as hereinbefore described.

It is an aid to identifying direction-finding stations to have differently colored fluorescent screens for each tube associated therewith to show differently colored signal lines, such as red, green, and blue, but it is not as important in the present instance as in other combinations about to be described where all three signal lines appear on a single screen.

Several modifications of the "grouped screen" design are shown in Figs. 42 and 44. In Fig. 42 the screens 405, 406 and 407 take the form of hexagons instead of the common circular shape to allow of closer grouping of juxtaposed reference and signal lines, with grounded shielding (not shown) between each of the tubes 408, 409 and 410.

Fig. 44 illustrates the screens 411, 412 and 413 of rectangular shape to provide for a common straight vertical distance scale 414 which the signal lines 415, 416 of each tube 418, 419 may intersect, at the same time providing a direction indication from tube 420. Measurements for direction and distance with this arrangement of tubes are similar to the system disclosed in Fig. 40, while measurements with the grouping of hexagonal tubes, Fig. 42, are similar to the system disclosed in Fig. 43. In the former embodiment, the group of tubes is oriented until the direction indicator registers approximately with its reference line to secure readings in the proper scale quadrant.

The longitudinal dimensions of the tubes in group formation should preferably be much greater than the ordinary oscilloscope tubes, in comparison with screen diameter. I have found it to be of great advantage to keep that part of the image line which intersects the scale as near the center of the tube as possible and still allow for a large diameter screen with accurate indications. This can only be accomplished by lengthening the beam of the tube, since a short focus tube produces distortion near the perimeter of the screen.

A good proportion of beam length as measured from the second anode to the screen and screen diameter is 10 to 1, an example of which would be a beam length of 20 inches with only a 2-inch diameter screen. Such a tube need not be flared at one end as is customary but may be of the same shape throughout its length. Thus, if round tubes are used, they may be in the form of straight cylinders, Fig. 43. If hexagonal screens are used, Fig. 42, the tubes may be in the form of hexagons. In addition to the feature of the production of distortionless images, the tubes may be more closely grouped when designed as shown.

Fig. 45 illustrates an optical system whereby the individual indications as shown by corresponding cathode ray tubes connected to each direction-finding station are superimposed on a single screen such as one of ground glass and viewed in a darkened cabinet. To enable the observer to differentiate between signal lines representing respective direction-finding stations, the screen of the respective tubes is made of a different fluorescent material, producing a differently colored signal line. As an example of these active materials, the following list affords a choice of screen colors:

Zinc orthosilicate_____ Green
Zinc beryllium silicate_____ Orange to green
Zinc sulfide (silver activated)_____ Blue
Zinc cadmium sulfide_____ Red to blue
Cadmium tungstate_____ White or light blue Referring to Figs. 45 and 46, the three cathode ray tube screens 425, 426 and 427 are arranged adjacently with their centers in a straight line, each with its reference line 425', 426' and 427' in a vertical position. The deflectors of each tube are connected by cables to the direction-finding stations 428, 429 and 430, respectively. Projection lenses 431, 432 and 433 for each screen are then arranged at the proper focal distance from, and to secure magnification of the cathode ray images on, a ground glass screen 434.

The plane of each cathode ray screen is adjusted until the image on the ground glass appears as a faint circular composite image 435 of all three screens, with the three brilliant, differently colored, images or signal lines 436, 437 and 438 of each screen superimposed. When the transmitting craft (not shown) is at distance infinity, there appears but a single line, the color of which is a combination of the colors of the three separate tubes. At medium range, there will appear three lines, each of a different color, and inverted, starting from the center of the screen and extending toward the perimeter to a distance scale 439. The entire system should, of course, be enclosed in a light-tight cabinet indicated by the broken line and the ground glass screen viewed through a suitable aperture.

The method of determining the earth quadrant or sector over which the transmitting craft is located is determined by relative line length in substantially the same manner as hereinbefore described in connection with the direct viewing of grouped screens.

Another method of simultaneous viewing of the three direction-finding indications is shown in Fig. 48. A special cathode ray tube 440 is provided with a double screen 441 formed by coating a circular sheet of thin glass on both sides with a fluorescent material of two different colors. For example, one side may be coated with zinc orthosilicate to produce a green image, and the other side with cadmium tungstate to produce a white image. Obviously, both sides of such a screen ordinarily cannot be viewed simultaneously and to make this possible concentric rings of active material are removed from one side of the glass screen, leaving concentric rings 442 of clear surface alternating with rings 443 of active material.

The same process is carried out with the screen on the opposite side, but in staggered formation, as shown in Fig. 50.

When viewed from either side, a complete screen is seen, made up of alternate concentric rings of active material, alternate rings representing a portion of the opposed screen surfaces. The screen so formed is fixed to the middle of the inside of a double conical transparent glass envelope 444 with the usual filament, control grid, anodes, and deflectors, fixed within the extremities or apex 445 and 446 of each cone. The complete cathode ray tube so formed may be viewed from either end, and the screen may be seen through the transparent walls of the tube. Each half of the tube is operated independently and produces its own screen image.

The effect when seen from one side of the screen is to show two radial lines extending from the center toward the perimeter of the screen. Each line will be broken up by short spaces of inactive material, and each line will be of a different color which enables the observer to associate each line with its particular direction-finding unit location. A scale 447 with reference line 448, Fig. 49, is etched on the perimeter of the screen on the side to be viewed, and the signal lines 449 and 450 of different colors intersect the degrees marked on the scale to indicate distance. The deflectors of each half of the tube 440 are connected to pairs of receivers 451 and 452 which translate the energy received by crossed loops or direction-finding antennae 453 and 454.

A second cathode ray tube 455 with screen 456 is shown as associated with the double tube 440. This may be the standard cathode ray tube, with a screen color different from those of the other two screens, for example blue. This tube is placed with a reference line 457 on its screen in a vertical position and the tube may be placed above or below the special tube screen 441, shown as above the screen in Fig. 48.

The deflecting system of this tube 455 is connected to the outputs of the pair of receivers 458, the input circuits of which are fed from direction-finding antennae 459. This single tube primarily indicates direction, but the length of its signal line 460 cooperating with the scale 461, when compared with the lengths of the two lines of the double tube, serves to indicate the earth sector over which a transmitting craft is located, as described in connection with single tubes in group formation, the screen having the longest line indicating by its associated direction-finding station location the earth sector within which the craft is located.

Tests for equality of each pair of receivers in all forms of grouped cathode ray tube indicators may be carried out by means of a signal generator (not shown) placed in equi-signal relation to the desired pair of direction-finding antennae and receivers. When both receivers have identical outputs, the test line image on the cathode ray screen will be exactly over the reference line. If it is to one side or the other, the individual attenuator of each receiver is adjusted until the test line is in its proper position over the reference line. The craft signal is to be turned off during this operation.

Although the system described herein is intended primarily for rapid and approximate readings to correspond with the high speed of modern craft, I have improved the cathode ray compass employed in the system and described herein to a point where it is far more accurate for slowly moving or stationary craft than the most carefully constructed null type or right-left indicator compass, as commonly employed at the present time, or the "spot" type of cathode ray compass.

As an example, null type radio compasses, manually operated and commonly believed to be the most accurate type, are considered excellent if the minimum is not broader than one degree with a sensitivity of 3 microvolts per meter. With my improved cathode ray "line" compass, however, readings may be taken to a small fraction of one degree. It is possible to produce, by the methods shown, an extremely fine brilliant radial line on the screen, easily seen. This line may be of a width corresponding to approximately 120 lines per inch at the point where the line intersects the scale. The apparatus thus becomes an instrument of precision.

Thus, if the screen is 4 inches in diameter, one quadrant may contain space to accommodate 360 lines, each distinct from the other, which signifies 4 lines per degree of the 90° in the quadrant.

An important point to be considered is that a craft flying over an earth sector controlled by this screen quadrant will, in passing, create a visible line which sweeps the entire screen quadrant; therefore it is only necessary to define this line to obtain the exact position of the craft. This is not the limit, however. Under a powerful magnifying glass it is possible to discriminate again between fractions of one line, as follows.

Three lines 462, 463 and 464, Fig. 58, on the screen, which appear to the naked eye as being apparently one line, are seen under a powerful glass 464' to be three lines superposed with their identifying characteristics, one being offset with respect to another. This displacement can be seen to within one-half of a line width, or 0.125 of a degree. Even greater discrimination may be accomplished with practice by this means.

The advantage of such extreme discrimination becomes apparent when applied to the distance-determining system herein described, as it permits closer grouping of the receiver stations, for determination of a given distance, or within a restricted area such as the deck of a plane carrier, it permits the determination of greater distance.

A better appreciation may be had by considering the twenty-to-one ratio which I have previously adopted in earlier applications. This ratio was intended to imply that with ordinary discrimination by a meter needle or ordinary cathode ray compass, the distance could be determined when it was twenty times that between stations.

With my improved compass, however, using the same receiving station locations, the ratio may be easily increased to at least one hundred to one. A separation of receiving stations on a plane carrier deck, for example of 100 feet, allows determination of zenith distance or elevation up to approximately 10,000 feet. On land, with a separation of one mile between stations, distances may be determined up to 100 miles.

Accuracy of distance is always greater than for direction, as I have explained in my U. S. Patent No. 2,255,659, because direction measurements must be absolute, while distance measurements are comparative, and it is not essential that the lines on the screen point at the transmitter when distance alone is determined.

The production of a perfectly straight direction signal line on a cathode ray compass of the Watson Watts type has been a vexatious problem for more than twenty years. It is to be understood that this perfectly straight line is not the ordinary straight line as seen on any oscilloscope screen resulting from a simple application of alternating current voltage to one set of deflectors. Neither is it to be confused with the straight line on a cathode ray screen when a direct current deflection is interrupted, which serves no useful purpose.

The usual method of obtaining this line on a Watts cathode ray compass is to combine the two direction-finding received voltages in perfect phase and rely upon this perfect phasing to produce the straight line. The extreme difficulty of doing this in practice, since the slightest change in adjustment is liable to de-phase the circuits, has been one of the drawbacks to the practical adaptation of the Watts compass.

The method herein described for producing a straight-line direction signal indication obviates the necessity of perfect phasing of the two received direction signals at radio or audio frequencies by first reducing the received energy from both signals to direct current, and then modulating simultaneously the direct current energy of each received signal so produced by a pulse transmitter located either at the transmitter or receiver. This pulse transmitter, because of its straight line characteristics, produces corresponding straight line resultants on the screen. Such slight circuit adjustments as are needed may then be carried out at very low audio frequencies which require very little adjustment and when once adjusted remain constant.

The importance of this straight line will be appreciated in the following description of its application to identifying indicia. Referring to Fig. 51, it will be seen that the output of each receiver 465, 466 and 467 with respective loops 465', 466' and 467' is fed sequentially to the vertical deflector 468 of the cathode ray tube 469. The horizontal deflector 470 is correspondingly fed from the outputs of companion receivers 471, 472 and 473 with respective loops 471', 472' and 473'. The result of this sequential operation is to produce on the viewing screen three permanent lines 474 extending from the center of the screen 469' outward, one line for each pair of receiving stations 465—471, 466—472 and 467—473, as hereinafter set forth.

Persistence of vision and persistence of screen material cause the otherwise slowly shifting line from one position to another to appear as three stationary lines. Of these three lines, the intermediate line will always indicate, by being directly in line with, the direction of a transmitting station or craft. The two outside lines will then always indicate, by the angle they form in degrees, the distance from the craft to the center of the circle of receiving stations, or to a particular receiving station, depending upon whether the control or observation station is located in the center of groups of receiving stations or at one of the stations.

The direction of approach of the craft to the control station by identification of the receiving path is observed in the following manner.

In my U. S. Patent No. 1,828,531 dated October 20, 1931, I have shown a method of identifying the energy received from either of two directional transmitters by varying the timing of contact of the transmitter distributor. In the present embodiment, an interruption is effected in connection with the received signals.

Referring to Figs. 18 and 19, it will be seen that each receiving station is identified on the viewing screen of the cathode ray tube by a particular variation of line continuity. Thus, receiving station 226 is identified by a plain line 232, 232'. Receiving station 227 is identified by a line 234, 234' broken into short dots, or, in other words, a dotted line. Receiving station 225 is identified by a line 233, 233' broken into dashes, forming a broken line. The production of these characteristic lines is accomplished in the following manner.

Referring again to Fig. 51, a contact arm 480 is attached to a shaft 481 and therefore rotates in synchronism with the sequential switching arms 482 and 483 carried by and insulated from the shaft. These arms serve to connect sequentially the respective retransmission cables 484—484', 485—485' and 486—486' from the corresponding direction-finding antennae and receivers with the deflectors of the cathode ray tube 469 through corresponding rectifiers 490 and 491.

The arm 480 serves to make contact with fixed toothed segments 492, 493 and 494 in sequence. The teeth or serrations of segment 492 are of relatively short length and are close together, while the serrations of the segment 493 are relatively large and farther apart than those of segment 492. In the segment 494 they appear only at the start and finish of the arc of contact of arm 480.

The result of contact with these characterizing serrations is to produce on the viewing screen a line indicative of the location of the corresponding direction-finding station, the retransmission cable of which connects with the sequential switching arms. This line interruption continues for a particular station as long as the corresponding sequential switching arms maintain the contact, and the effect is to vary the light continuity of the signal line on the screen, the same appearing as broken up into a line of many small dots while contact arm 480 passes over segment 492.

When the arm 480 passes over segment 493, the effect is to make the line appear as a line broken up with a series of longer dots or dashes, and when passing over segment 494, the line remains solid.

The effect of contact of switch arm 480 with any of the segments mentioned is to complete a circuit of the biasing voltage of the control grid 495 of the cathode ray tube 469. Normally, this biasing battery comprises two batteries connected in opposition, for example, a battery 496 of −20 volts and a battery 497 of +10 volts connected in series. The algebraic sum of this voltage is −10 volts which is the normal bias of the control grid, permitting sufficient beam current to flow to form the spot or line on the screen with the desired brilliance.

This occurs when the switch arm 480 is off contact with any segment but the sequential switching arms 482 and 483 are making contact to allow energy from the direction-finding station to pass to its respective receivers and amplifiers to the deflectors 468 and 470 of the tube. When the switch is rotated by the motor 498 until the contact arm 480 is making contact with a toothed segment, the battery 497 of +10 volts becomes momentarily short-circuited through a resistor 497', allowing the battery 496 of −20 volts to place a negative bias on the control grid 495 sufficient to cut off entirely the beam current, hence a small length of the signal line is suppressed on the screen, this length depending upon the duration of contact of arm 480 with the corresponding segment serrations.

The same principle is utilized to suppress any parasitic images which might be produced on the screen during the change-over from one direction-finding cable to another and is hereinafter described in this connection.

With very long persistence screens, the "light" of the line may not be entirely suppressed, when the negative bias is cut in, but there will always be sufficient characteristic shading of the line to provide for its identification.

Switches 498 and 499 serve to connect in either the identifying segments 492, 493 and 494 or the light-suppressing segments 500—500', 501—501' and 502—502' at each end of the corresponding identifying segments for the prevention of parasitic flashes on the screen. When both switches are closed, both sets of segments are in operation. When both switches are open, neither set is in operation, and when but one is closed, only the segment controlled by it is in operation.

The viewing screen of the cathode ray tube is "alive" or operative in only one quadrant. This "live" quadrant may be shifted to any quadrant of the screen either by physical or electrical means. For example, referring to Fig. 53, it will be seen that the entire screen and cathode ray tube may be rotated 360°. For this purpose, the tube is mounted in a shielding cylinder 510 with screen 511 exposed at one end. The cylinder at its opposite end is supported by a central hollow shaft 512 mounted in a thrust bearing 513, the latter being supported on a plate 514 carried by a vertically disposed framework 515. The cylinder 510 at an intermediate portion is surrounded by a circular hand rail 516 fixedly attached thereto for manually rotating the tube about its longitudinal axis. A suitable spring-urged detent 517 secured to the framework is designed to engage a selected notch 518 of a series of notches in the rail, in the present embodiment six, 60° apart, to position the tube.

The electrical conductors to the elements of the tube are made into a flexible shielded cable 519 extending upwardly through the hollow shaft to the base of the tube.

Attached to the top of the framework is a disc 520 of transparent material such as glass bearing a further transparent cartograph disc 521 coaxial with the longitudinal axis of the cathode ray tube, more clearly shown in Figs. 60 and 61. An opaque shield 522 is superposed on the cathode ray screen 511 to expose only the active quadrant with a lateral and central margin. The indicia 523, 524 and 525 appear on the live quadrant of the cathode ray tube, as shown in Fig. 54, and the middle one is to be registered with corresponding earth sector identifying indicia indices 526, 527 and 528 on the cartograph, Fig. 61, as hereinbefore described, and the cylinder locked in the corresponding notch.

In setting up the apparatus, the entire visual indicator is to be oriented to a north-south line, a magnetic compass 529 being associated therewith for this purpose. This compass, for example, may be supported on the transparent disc 520, and when the apparatus has thus been properly aligned, the cartograph is to be positioned on the disc to conform to the cardinal points of the compass 529. The cylinder 510 is then to be rotated until the index 530 of the live quadrant visible through the cartograph aligns with one of the identifying indices 526, 527 and 528 provided on the cartograph. One of the six notches on the rail 516 should then be engaged by the detent 517.

Fig. 56 illustrates a fragmentary section of a suitably lighted scale member 535 used for the calibration of distance in connection with the live quadrant of the cathode ray screen 511. The frame 536 of the scale member should preferably be constructed of some opaque material such as metal or plastic, with a beveled insert 537 of "Lucite" or other transparent light-refracting medium along the edge of which is engraved a scale 538 graduated in degrees. Between the scale to be illuminated by the lamp 539 and the surface of the cathode ray screen is interposed a thin opaque strip or partition 540. This partition serves to prevent the scale-lighting from interfering or dimming the light indicia 541 on the screen. In the drawings the height of this partition is exaggerated. Actualy, it is only about $\frac{1}{32}$" in height.

Edge-lighted or back-lighted scales which serve to prevent interference of the scale light with the indicia may be used for this purpose.

It is to be understood that the apparatus is suitable for measurement in zenith as well as in azimuth depending upon the polarization of the antennae at the receiver stations. This may be accomplished by changing the polarization of the antennae of the receiver stations or by duplicating the entire apparatus and receiver stations, in which case a convenient arrangement of the visual indicating apparatus is shown in Fig. 59. The two screens 542 and 543, respectively, of the two apparatus may then be located at right angles to each other, the former in a horizontal plane for determinations in azimuth and the latter for zenith or altitudinal determinations.

Upon the reception of an image on the screen, which will always appear in the same screen quadrant, regardless of the azimuthal position of the viewing screen, there will appear three lines 523, 524 and 525, Fig. 54, starting from the center of the screen 511 and projecting outwardly toward its periphery, the angle formed by the two outside lines indicating the distance and the intermediate line 524, the direction of a craft from a control station or from a direction-finding station. One of these lines will be plain, another a dotted line and the third a broken line of dashes.

By observing the relative position of these lines, the geographical direction of approach of a craft with relation to the associated map 521, Fig. 61, may be determined. As an example, if the plain line 524 appears between the dotted and broken dash line, then in accordance with the identification scheme as shown in Figs. 62, 63 and 64, the craft 549 is approaching in the sector controlled by receiver station 550, over a portion north of the observation station located at the center of the receiver stations 550, 551, and 552, since the receiver at station 550 is identified by a plain line 526 on the map 521.

If the dotted line appears between the other two lines, Fig. 63, then the craft is approaching in the sector controlled by receiver station 551, as that receiver is identified by the dotted line 527 on the map.

If the broken dash line 523 appears in the intermediate position, then the craft is approaching the sector controlled by receiver station 552, as indicated by the line 528.

By grasping the railing handle 516, the entire cathode ray tube with screen may now be rotated from any position to a position where the intermediate line on the screen image registers with and matches the corresponding identification line on the map. This rotation of the tube is made possible by the flexible cable feeding the tube elements. It will be noted that in the present embodiment the map is divided into three sectors, identified by the indicia indices 526, 527 and 528, corresponding to the number of receiving stations 550, 551 and 552. It is to be understood that if there are more than three receiving stations, there will be a larger number of sectors on the map, one for each receiver.

The data on the cartograph may, of course, be varied. For example, the cartograph indicated in Fig. 61 is of the general type suitable for intermediate or long-range measurements in which there is represented on the cartograph such features as the surrounding towns or cities, and scale of miles 561. For shorter range or for blind landings at close range, the cartograph 562 shown in Fig. 60 may be utilized. In this instance, larger scale representations may be had as well as more detailed local features, for example, the administration building 563, airport runways 564 and receiver station locations 565.

In addition, it will be noted that in the present embodiment, for purposes of practicability and economy, there are three sectors on the map, each including 120°, whereas the viewing screen is divided into four quadrants each by reason of the distribution and number of deflector plates. To make certain, therefore, that there will be no "blind" sectors on the map, where the 90° of the screen does not completely cover the 120° of the map, there are six locking positions or notches 518 of the railing 516 for cooperation with the locking device 517.

The rule for the observer to follow is to lock the screen in the position nearest to the identification line on the map. Since it takes but a fraction of a second to shift the screen and may take thirty seconds or more for a craft to move out of one earth sector into another, it will be seen that this means of location identification very easily keeps pace with even the swiftest craft in flight.

The 180° ambiguity which exists, as is well understood, when crossed loops are employed may be eliminated as hereinafter described. The three groups of receivers are always equalized, as will hereinafter be shown, and therefore the length of the three lines on the screen will bear a definite relation to the distance away of the craft, by the attenuation law of radiant energy. For example, the receiving station nearest the craft will always produce the longest line of the three on the screen and will always be between the two outside lines. This long line should always register with and match the identification line on the map. If it does not, it will be found that the middle line is the shortest of the three, and the entire viewing screen should then be rotated 180°, for example, to the position indicated by the dotted extension 524' of line 524, and locked in place. It will be found that the middle line is now the longest of the three, and in this position all directions on the map will be accurate and the craft will be approaching along the intermediate line and in the direction in which this line points from the center of the viewing screen.

An electrical method of shifting the "live" quadrant of a cathode ray tube to any one of the screen quadrants is shown in Fig. 65. As indicated, it will be seen that it becomes possible to fix the tube 568 rigidly in place, which will allow of attaching the map (not shown) rigidly to the screen surface 569. A four-arm rotating switch 570 is utilized for this purpose, arms 571, 572, 573 and 574 being adapted to make contact sequentially with four different sets of fixed contacts circularly arranged about the switch, each comprising four terminals $a^1$, $a^2$, $a^3$, $a^4$; $b^1$, $b^2$, $b^3$, $b^4$; $c^1$, $c^2$, $c^3$, $c^4$; and $d^1$, $d^2$, $d^3$, $d^4$, respectively, and spaced apart to register with the respective switch arms.

Each one of the rotating arms is connected through flexible leads 571', 572', 573' and 574' with a respective terminal of the deflecting plates 575, 576, 577 and 578 of the tube, and each plate has a loading capacity 579, 580, 581 and 582, respectively, with variable leak resistors connected in shunt to ground. Each one of the terminals of the fixed contacts is a terminal of an output circuit derived from the receiver systems 585, 586, through transformers 587 and 588, respectively.

In the position shown with the switch arms contacting the terminals $a^1$, $a^2$, $a^3$, $a^4$, the secondary of the transformer 588 is connected through a rectifier 589 to deflector plate 575, and the secondary of transformer 587 is connected through the rectifier 589' to deflector plate 576. Switch arm 573 connects deflector plate 577 to ground, and switch arm 574 connects deflector plate 578 to ground.

The foregoing combination provides on the screen 569 a straight line 590 starting at the center of the screen and extending toward its perimeter in the upper quadrant A of said screen.

Successive rotations of the switch in a counterclockwise direction produce the following effects. With switch arm contacting the terminals $b^1$, $b^2$, $b^3$ and $b^4$, the secondary of transformer 588 is connected through a rectifier 591 to deflector plate 575, and the secondary of transformer 587 is connected through rectifier 591' to deflector plate 576. Switch arm 573 then connects deflector plate 577 to ground, and switch arm 574 connects deflector plate 578 to ground.

Because in this switch position the rectifiers 591 and 591' connected to the deflectors 575 and 576 are reversed with respect to rectifiers 589 and 589', the image or line 590 will appear in the diametrically opposite quadrant B.

With the switch arms in the position to contact the terminals $c^1$, $c^2$, $c^3$ and $c^4$, the secondary of transformer 588 is connected through grounded lead 592 to the deflector plate 575 and the secondary grounded lead 593 of transformer 587 to deflector plate 576. Switch arm 573 connects the secondary lead 594 through rectifier 589' to deflector plate 577; and the switch arm 574 connects the secondary lead 595 through rectifier 589 to the deflector plate 578.

In this position of the switch, the image appears in the quadrant C because, although the polarity of the rectifier is the same as for the first-named position of the switch, the relative positions of the deflectors are reversed.

With the switch arms in the position to contact the terminals $d^1$, $d^2$, $d^3$, and $d^4$, the secondary lead 592 is connected through arm 571 to deflector plate 575, and secondary lead 593 through arm 572 is connected to deflector plate 576. Arm 573 connects secondary lead 594 through rectifier 591' to the deflector plate 577. Switch arm 574 connects secondary lead 595 through rectifier 591 to the deflector plate 578. The image appears on the screen 569 in this instance in a diametrically opposite quadrant D from the quadrant C because the rectifiers are reversed and hence the polarity of the deflector energizing voltage.

In the practical embodiment shown herein, there are three earth sectors only controlled by the three direction-finding stations 605, 606 and 607, Fig. 66, whereas there are four screen quadrants A, B, C and D. The appearance of three identifying indicia 608, 609, 610 as they would appear on the cathode ray screen when transferred to each of the four quadrants A, B, C and D in succession is shown. It will be observed that the indicia as they appear in quadrant A are in the correct position for making determinations of distance to a craft over the earth sector controlled by direction-finding station 605, since it is the only position where the three indicia appear in the middle of the quadrant.

It will be noted that with this combination the angle between distance indicating lines is limited by the screen quadrant boundary, as shown. This serves as an additional means of quickly identifying the direction of the earth sector over which the craft is flying, by noting by trial, such as by switching from one quadrant to another, in which quadrant the direction-indicating line is located in the middle. This quadrant will be the one in which the direction indicium points at the craft, with the 180° ambiguity present.

This novel electrical method of shifting the live quadrant of the screen is better adapted for use with four direction-finding stations when the identifying indicia are employed. With this combination, the directional indicia may always be found in the middle of any one quadrant.

When images on the cathode ray screens are produced from the energy derived from two translation or receiver channels, it is essential for accuracy that some means be provided to insure that the two translation means are matched as to their amplification gain and directional discrimination qualities.

It has been customary heretofore in the design of a Watts cathode ray compass to compare the output circuit values of each receiver separately by receiving from a local source of energy such as a signal generator, as shown in my U. S. Patent No. 2,255,659. This method requires that the craft signal be cut off while the equalizing signal is being used. This has the disadvantage of not being able to trace the craft while the test signal is on. To make it possible to view both craft signal and testing signal at the same time, means illustrated in Fig. 52 may be employed. Thus, a test for equality of linear amplification of the two receivers or translation means is accomplished by means of the rotating switch mechanism comprising a rotatable shaft 610 carrying the contact sectors 611 and 612. These are adapted for contact sequentially with the fixed contact members 611a, 611b and 611c and with fixed contact members 612a, 612b and 612c.

The primary purpose of this switch is to complete sequentially the input circuits of the pair of direction-finding receivers 613 and 614 from the directional antennae 615—615', 616—616' and 617—617' to provide for persistence of vision, as is hereinafter more fully described. It is preferred in this instance to have the connecting leads of coaxial type or of the transposed transmission line type.

The outputs of the pairs of receivers 613 and 614 are respectively connected through the output transformers 618 and 619 through rectifiers 620 and 621 to the deflector plates 622 and 623 of the cathode ray tube visual indicator 624. The rectifiers 620 and 621 are provided respectively with condensers 627 and 628 shunted by corresponding variable resistors 627' and 628'.

The same apparatus may be used for testing receiver or loop equality, but it is to be understood that the receiver equality must be obtained before testing for loop equality. For example, the switch arms 611 and 612 which are aligned on the shaft serve to connect sequentially the said directing-finding antennae at a rate to permit persistence of vision with a predetermined screen persistence. If the screen persistence is long, then the speed of the rotating switch may be low, for example 10 revolutions per second when the screen persistence decay is one-tenth second.

It is to be understood that the speed of rotation of the switch arm must be multiplied by the number of contacts made by it in one revolution when considering the factor of persistence of vision.

To illustrate, with ordinary screen persistency such as commonly employed in television, the speed should be at least 30 revolutions per second to make three contacts in sequence, since it is necessary for persistence of vision for each contact to maintain at least 10 vibrations per second. With longer screen persistence, this may be greatly reduced, as is well understood.

In all cases it is preferable to maintain a speed of rotation of the switch such that the number of contacts per second is less than that of the pulse generator frequency. It is also preferable to maintain the switch contact frequency at some even fraction of the pulse frequency to secure an even distribution of light of the signal line and prevent "creeping shadows" from appearing on it.

The outputs of receivers 613 and 614 are shunted by the respective attenuators 625 and 626 which serve the purpose of increasing or decreasing the output of each receiver until the respective receiver outputs are equal, as indicated by the corresponding lengths of the image lines 630, 631 on the screen 632, each of which is indicative, not of the combined effect of said two receivers 613 and 614, as is the case in viewing the craft signal for measurements of direction or distance, but of one receiver only, as received by a non-directional antenna for testing purposes, which delivers its output energy to its respective deflectors independently of the other receiver.

The switch arms 611 and 612 serve to connect with the directional antennae 615—615', 616—616' and 617—617' or the non-directional antennae 635—635', 636—636' and 637—637' for sequential switching, in accordance with the position of corresponding antenna switches 638—638', 639—639' and 640—640'.

To prevent "spider webs" or "shooting stars" from appearing on the screen due to stray impulse shocks caused by the make and break of the switch arms, a novel device is employed. This device consists of a contact arm 650 rigidly fixed to the shaft 651 in such a position that it makes contact with a segment 652 slightly before the receiver switch arms 611 and 612 make contact with the respective contacts 611a and 612a and maintains a further contact 652' for a short period after the receiver circuit contacts are completed.

The contact arm 650 and the segments 652, 652' are terminals of one of the biasing batteries of the cathode ray tube control grid 655 and serve to extinguish the illumination of the spot in the following manner. The negative bias battery 656 is normally of such a potential that the correct illumination of the spot or line is maintained after the receiver contacts have been made. This negative bias is the algebraic sum of battery 656 and a battery 657 connected in opposition. For example, battery 656 is made −20 volts and battery 657 is made +10 volts. The algebraic sum is then −10 volts which is the normal bias voltage of the control grid. The battery 657 is thus opposed to bias battery 656; and when the light-switch arm 650 makes contact with the segments 652, 652', battery 657 will be short-circuited through a resistor 658 and as it no longer can oppose battery 656, the full negative bias of battery 656 is available to completely extinguish the spot of the tube by preventing electrons from passing through the control grid, during the change-over period of the receiver sequential switch arms 611 and 612.

It will be seen that the entire switching apparatus shown in Fig. 52 serves the double purpose of sequential switching and testing. The operation of testing is conducted as follows: Assuming that it is desired to test the equality of the receivers 613 and 614 and at the same time receive direction-finding indications from a craft over a particular earth sector, for example, by the station comprising the directional antennae 615—615', the switches 638 and 638' are to be thrown to connect in circuit the said directional antennae 615—615' and at the same time disconnect the non-directional antennae 635—635'. Manual switch 639 of the station comprising the antennae 616—616' and 636—636' is thrown to disconnect both the non-directional antenna 636 and the directional antenna 616, and switch 639' disconnects the directional antenna 616' and connects in circuit non-directional antenna 636'. Similarly, in connection with the station comprising the antenna 617—617' and 637—637', switch 640 is thrown to disconnect directional antenna 617 and to connect in non-directional antenna 637, and the switch 640' is thrown to disconnect the directional antenna 617' and to disconnect the non-directional antenna 637'.

The rotation of the sequential switching arms 611 and 612 serves to connect these two antennae through the fixed contacts 611a and 612a simultaneously to the inputs of receivers 613 and 614, respectively, the outputs of which receivers are connected to the deflectors 622 and 623 of cathode ray tube 624. The result of this rotary switch contact is to produce on the screen 632 the line 633 in the middle of the active quadrant of the screen. The angle of this line will be indicative of the direction of the craft in the selected sector.

During this operation, the non-directional antenna 636' is connected to the fixed contact 611b by closing of the manual switch 639'. Similarly, the non-directional antenna 637 is connected to the fixed contact 612c by closing of the manual switch 640. It will now be seen that the sequence of operation of rotary switch arms 611 and 612, for receiver equality testing, is to connect non-directional antenna 636' to receiver 613 through rectifier 620 to deflector 622 by means of switch arm 611. This produces a vertical deflector line 630 on the cathode ray screen 632, the length of which line is indicative of the output of receiver 613.

A moment later these connections are interrupted by the rotating switch arm 611 and the arm 612 makes contact with the fixed contact 612c, thereby connecting non-directional antenna 637 to the input of receiver 614. The output of said receiver is connected through rectifier 621 to the deflector 623, producing thereby on the screen 632 the straight horizontal line 631, the length of which is indicative of the output of receiver 614. If the lines 630 and 631 are not of equal length, they should be made so by adjusting the respective attenuators 625 and 626. This operation equalizes the output circuits of receivers 613 and 614.

The complete switching sequence for producing craft signal and equality signals simultaneously is as follows. Switch arm 611 makes contact with fixed contact 611a (directional antenna 615) and switch arm 612 makes contact with fixed contact 612a (directional antenna 615') at the same instant. After progressing 120°, switch arm 611 makes contact with fixed contact 611b (non-directional antenna 636'), while arm 612 makes contact with fixed contact 612b (dead). After progressing another 120°, switch arm 611 makes contact with fixed contact 611c (dead), while arm 612 makes contact with fixed contact 612c (non-directional antenna 637).

If the craft has been located in either of the other earth sectors controlled by direction-finding antennae 616—616' or 617—617', the same procedure is followed by corresponding manipulation of the manual switches.

By the successive switching in of the outputs of the respective antenna groups to the receivers, the outputs of which are connected to the cathode ray tubes, the three lines which are produced sequentially will, due to screen and vision persistence, appear simultaneously, the intermediate line being indicative of craft direction from the selected station, in the instant example that comprising directional antennae 615—615'. The other two lines are indicative of respective receiver outputs, derived from the respective non-directional station antennae 636' and 637, for purposes of equalizing the outputs of receivers 613 and 614.

This system of receiver equalizing from the reception of craft signals simultaneously with the reception of craft direction signals on the same screen, is diagrammatically represented in Fig. 69. In this figure the various elements are numbered to correspond with the elements of Fig. 52, hereinbefore described in detail.

It is to be understood that the three direction-finding locations employed for testing are to be those either inside the control room or grouped closely together nearby. In all cases it is important that the non-directional antennae be close together to avoid difference in line length due to different attenuations of signal caused by different distances from craft to receiving antennae and not to receiver amplifier gain.

In addition to a test for receiver output or amplification equality, provision is also made for testing equality of loops or direction-finding antennae employed in the system as regards their relative signal pick-up. The apparatus for determining this equality is shown in Fig. 17 in which the signal generator 210 is rigidly attached to the upright support of the two direction-finding antennae 202—204 and 203—205 and in equi-signal relation to them, as regards reception angle. The receivers 665 and 666 are provided to detect and amplify the energy picked up by the antennae 202—204 and 203—205, respectively.

The procedure for testing for loop pick-up equality is to first test the receivers for amplifier equality by the method previously described in connection with the non-directional antenna.

Knowing then that the receivers are equalized, any further inequality can be detected by connecting in a loop equalizer. A simple portable rotating switch mechanism 667, similar to that described in connection with the direction-finding sequential switching mechanism, Fig. 52, or as more fully described hereinafter in connection with the switch shown in Fig. 67, is utilized for this purpose. Manual switches 668 and 669 serve to disconnect temporarily the receivers 665 and 666 from their regular position in normal connection to the control station, and connect them temporarily to the rotating switch loop tester 667.

With the signal generator 210 made operative by closing key 212, and the two receivers equalized, two lines will appear on the testing cathode ray screen 670, each indicative of the algebraic sum of loop or antenna pick-up and receiver amplification. Knowing, as previously stated, that the receivers are equalized, any further inequality is to be compensated for at the loops or antennae themselves, such as by individually adjusting the inductance and pick-up of each loop or Adcock antenna by means of the telescoping inductances 202', 203', 204' and 205', until the two test lines on the cathode ray screen 670 are of equal length.

The purpose of testing for loop pick-up equality is to fix a reference line in the electrical center of the cathode ray screen, after such equality has been obtained. To this end, a transmitter of the craft frequency may be mounted on a movable craft such as an automobile, boat, or plane, and located at a distance from and in sight of a crossed loop or antenna location. By means of the usual pelorus, the craft is maneuvered until the line of sight between the antennae and the craft transmitter forms a median of the crossed loops or antennae. The angular position of the direction indicium or signal line on the cathode ray screen as shown at 671, Fig. 55, is observed when the craft is in this position, and the reference line 672 is etched or painted on the cathode ray screen immediately over this line. Thereafter, any deviation of the signal line from this reference line can be measured in degrees on the scale 673, and the absolute direction of the craft from the antennae determined. The lines 674 and 675 represent the equalization test lines.

The mechanism for testing the pick-up equality of loops or antennae or for testing the amplifier equality of individual pairs of receivers when they are located at the direction-finding stations is shown in Fig. 67 in which 680 designates a rotating shaft on which are mounted two contact arms 681 and 682 diametrically opposite on the shaft. Stationary contacts 681' and 682' serve to connect in one of the receivers 683 and 684 at a time.

To test for amplification equality, each receiver is connected in circuit with its corresponding non-directional antenna 685 and 686, the received energy from signal generator 679 then being amplified and applied to the respective cathode ray tube deflectors 687 and 688 with corresponding shunt capacities and resistors 687' and 688'. This produces on the screen 690 a single radial line 691 from one of the receivers 683, by its position on the screen indicative of the deflection characteristic (horizontal) of the tube, and a single line 692 from the other receiver 684 (vertical), said lines by their respective lengths affording a measure of the amplification of the receiver and measureable with respect to associated scales 693 and 694, Fig. 68, on the screen. The lines will always appear in the same relative angular positions, as they are merely indicative of the deflection paths.

By means of the attenuators 695 and 696 shunting each receiver, the outputs of both receivers may be made equal by observing the relative line lengths of horizontal and vertical deflection and adjusting the attenuators until these lines are made equal in length as observed in connection with the scales 693 and 694 adjacent thereto.

A modification is possible in the manner of effecting an equality test both where receiver pairs are associated at the direction-finding station and at the observation station by what may be termed an "infinity test." This procedure is based on the axiom that "Things equal to the same thing are equal to each other." That is to say, all of the indicia representative of the different direction-finding stations when the transmitter or signal generator is located at a predetermined point which is at an infinite distance, should point in the same direction on the screen, align with the reference line of said screen, and be of the same length to insure the desired equality among the respective receiver pairs or antennae pairs of the direction-finding stations.

Where the three direction-finding indicia appear on a single cathode ray screen, this alignment will result in the production of but a single line as all three lines will be superimposed. Difference in line length can be distinguished by difference in line brilliance.

Where individual receiver pairs are associated with each direction-finding station, if all the visual indicator lines point in the same direction and are of the same length, but do not align with the reference line, this will indicate that each pair of receivers has the same proportion of horizontal to vertical deflection sensitivity and the same output amplitude, but the proportion of horizontal to vertical deflection sensitivity is unequal between receivers of a pair.

If the lines all point to the reference line and are of the same length, this will indicate that each pair of receivers is identical with the others and that the proportion of horizontal to vertical deflection sensitivity is equal between receivers of a pair.

If the lines all point to the reference line but are of different lengths, each pair of receivers has a proportional deflection sensitivity identical with that of the others but the output amplitude of respective pairs of receivers is different although the output amplitude of each receiver of a pair may be equal.

To bring about a displacement of the lines to secure equal length and alignment of each with a reference line, thereby producing a single line coinciding with said reference line, differential adjustment of the respective receiver attenuators may be made, and a joint adjustment may be made of each pair of attenuators for correcting the length of an indication.

It will be understood, of course, that the signal generator or transmitter will be located at a considerable distance, say several hundred miles, or less if the direction-finding stations are only a short distance apart, to secure this "infinite" effect, and must transmit at the frequency of the receivers or frequency of craft to be located. The location of such transmitter also should be at ground level and preferably in line with the observation station and one of the azimuthal direction-finding stations.

If a single pair of receivers only is used, associated with a rotary sequential switch which alternately connects different pairs of direction-finding antennae to them, then the test is for equality of antenna pick-up and is made at the antennae by adjusting the pick-up, mutual angle, or reception sensitivity of each, either by increasing or decreasing the length of the antennae or changing their mutual angle until the indicia on the visual indicator represent equality of antenna pick-up by appearing as a single line coinciding with the reference line. It is assumed that in this instance the two receivers have been previously equalized as to their output amplitudes by one of the other equalizing means hereinbefore described.

It will be noted that in the arrangement shown in Fig. 67 there are two pairs of output transformers 700—700' and 701—701' between each reeciver and the cathode ray deflectors 687 and 688, the rotary switch contacts 681' and 682' for testing equality being included intermediate each pair of transformers. That is to say, the circuit between the transformers of a pair, such as transformer 700 and 700', is adapted to be interrupted by the rotary switch arm 681 at the contact 681'; and, similarly, the circuit between the transformers of the pair 701 and 701' is adapted to be interrupted by the rotary switch arm 682 at the contact 682'. The input of transformer 700 is connected to the receiver 683 and the output of the associated transformer 700' is connected through a rectifier 702 shunted by the filter 702' to the deflector plates 687. Similarly, the input of transformer 701 is connected to receiver 684 and the output of the associated transformer 701' is connected through the rectifier 703 shunted by the filter 703' to the deflector plates 688. This arrangement serves to allow the flow of output energy from each receiver to be interrupted by the rotating switch without producing parasitic flashes on the cathode ray screen, and is a method alternative to the method in which these parasitic flashes are prevented by suppressing the illumination of the line at the moment when they might otherwise appear.

It can be seen that if the plate circuit of the receiver carrying direct current were interrupted, a violent impulse would be induced in the transformer secondary with a corresponding parasitic flash on the screen.

If the deflector-rectifier circuit carrying direct current were interrupted, a violent inductive impulse would also be applied to the deflector with corresponding parasitic flash. By interrupting an intermediate transformer winding carrying audio-frequency alternating current, however, the resulting impulse is comparatively slight, especially if, in switching, one circuit is not disconnected until the other is in circuit.

This particular testing equipment may also be conveniently used to determine equality of receivers of each cathode ray tube in a group such as shown in Fig. 41 by substituting non-directional antennae for the directional antennae shown.

The receivers 613 and 614 of the circuit shown in Fig. 52 and receivers 465—471, 466—472, 467—473, of the circuit shown in Fig. 51, may be of the superheterodyne type, as described in said patent to Simon #2,170,835, or of the radio-frequency amplifier type with high audio or radio gain, or both. The receivers may also be of radio-frequency amplification only, with no audio amplification. An example of this type is the resistance-coupled amplifier receiver. Receivers of the latter type, however, because they do not operate entirely at audio frequencies, require coaxial or transposed transmission lines exclusively and therefore advantage cannot be taken of the cheaper ordinary telephone cables for retransmission to the observation or control station at audio frequencies. I have found it to be a distinct advantage to use broad tuning or aperiodic input circuits in receivers of the two-channel type, where freedom from interference permits and great sensitivity is not required.

This obviates the difficulty of tracking and equalizing sharply-tuned circuits such as those of the superheterodyne type.

It is important that receivers employed in the novel radio navigation system herein described have a linear amplification characteristic as this allows the use of attenuators for increasing or decreasing the gain without destroying proportionality of amplification gain. The tuning of receivers of any pair of direction-finding units may be accomplished individually or by a unicontrol switch, as is well understood. The audio output receiver is the most economical and most easily manipulated, and allows the use of ordinary telephone retransmission cables.

For reasons of simplicity in explaining the various drawings, the retransmission cables are usually shown as ground return cables, but it is to be understood that where earth induction currents are prevalent, duplex metallic conductors are to be used in practice.

The audio output transformers 618 and 619 utilized in the circuit shown in Fig. 52 may be connected with like secondary polarity or with unlike secondary polarity, to the respective rectifiers 620 and 621. By like polarity is meant that both transformers deliver maximum voltage at the same instant of the same sign to the rectifiers. By unlike polarity is meant that each transformer delivers maximum voltage at the same instant but of different sign, one being negative and the other positive.

Because of the single rectification of rectifiers 620 and 621, in the latter case, one transformer delivers voltage to one rectifier, while the voltage of the other is suppressed by the other rectifier. The net result is to apply like voltages to the deflectors alternately through the rectifiers.

If the transformers are connected to deliver like polarities or signs at the same instant, there will be but a single line on the cathode ray screen, which will be a combination of the line representing the charge of the deflector condensers, and the return line representing the discharge of the condensers. Sometimes, if the shunt resistors of these condensers are not properly matched, there may appear two lines, running parallel and very close together, one a very fine line and the other relatively wider. This is an indication that phase adjustment is required and the variable resistors 625 and 626 of Fig. 52 should be manipulated until the two lines appear as one.

If the transformers are connected to the rectifiers with unlike polarities, there will appear three lines on the screen for a single signal reproduction. One of these will be a relatively wide line 710, Fig. 57, extending radially from the center of the screen 711 to the perimeter. The second line 712 will be a very fine, faint line extending also radially, but always in the same place, i. e., along the path of horizontal (or vertical) deflection of the tube. The third line 713 connects the outer end of the first line 710 with the outer end of the second line 712, and is likewise a faint line, the position of the three lines forming a triangle, the base of which is the second line described, the altitude the third line, and the hypotenuse the first line.

The hypotenuse 710 is indicative of craft signal direction, the base 712 is indicative of the amplification of the receiver supplying the horizontal deflection component, and the altitude line 713 is indicative of the receiver amplification supplying the vertical deflection component.

The craft signal line 710 should always exactly align with the reference line 714 when lines 712 and 713 are of equal length, the reference line 714 being located in the exact electrical center of the active screen quadrant 715. Since line 710 is the resultant of lines 712 and 713, which are indicative of the horizontal and vertical deflection components respectively, this alignment of line 710 with reference line 714 when lines 712 and 713 are equal is proof that the outputs of both receivers and direction-finding antennae are equalized.

For simplicity of explanation, the cathode ray tube is shown in Fig. 57 as oriented to a position where the deflection paths of deflector plates 716 and 717 are actually in horizontal and vertical positions, respectively.

By comparing the relative lengths of the two faint lines 712 and 713, horizontal and vertical, a quick comparison may be made between receiver output current values. It is for this purpose that the two transformers may be connected to the rectifiers with unlike polarities or signs, if desired. Because the horizontal and vertical deflection component lines are very faint and very narrow, they do not interfere with the readings of the heavier signal line.

The flexibility of operation of my improved cathode-ray-line compass makes possible, especially in connection with the novel mechanically-operated, rotary, sequential switching device, a large number of combinations which may be required in the three-dimensional determinations hereinbefore described. For example, referring to Figs. 70 to 82, there are depicted by means of block diagrams several of these combinations; and those figures including a circumscribed circle indicate in addition that the apparatus is located within the observation station or in close proximity thereto. In these diagrams the crosses represent azimuthal direction-finding antennae and parallel lines represent zenith direction-finding antennae.

In the block diagram shown in Fig. 70, 750 represents the sequential switching device and 751, 752 and 753 represent the direction-finding loops or antennae connected thereto by the cables 754, 755 and 756, said switching device sequentially delivering the energy received from the respective loops or antennae to a pair of identical receivers 757 and 758 located at the observation station 759. The outputs from these receivers are connected to the respective pairs of deflectors of the cathode ray tube indicated by its screen 760. Since the direction-finding stations are closely grouped, they will show simultaneously by the indications 761 on the screen the absolute direction of the craft from the observation station and not the comparative direction of the craft from each individual direction-finding loop or antenna.

In the arrangement of Fig. 71 provision is made for both azimuthal and altitudinal determinations of direction simultaneously. This requires that each of the direction-finding stations 765, 766 and 767, of which the station 766 is of the altitudinal type, has associated therewith its own receiver unit which, in this instance, also is to be of the two-channel type. The sequential switching device 768 then connects one or the other of the two receiver units 769 and 770 to the cathode ray tube 771, it being understood that in this embodiment the direction-finding station 767 with its associate receiver 772 is temporarily disconnected by means of the knife switch 773. The indications 774 appearing upon the screen of tube 771 are indicative of absolute azimuthal and absolute altitudinal directions.

In Fig. 72 a combination is illustrated whereby directional determinations may be made alternatively in azimuth or in zenith. This is accomplished by the introduction of a single-pole, double-throw switch 775 serving to connect one or the other of the direction-finding stations 776 and 777 to a common lead 778 of the sequential switching device 779. A switch 780 temporarily disconnects the station 781. The single indication 782 appearing on the screen of cathode ray tube 783 represents then absolute direction either in azimuth or zenith in accordance with the station selected.

The combination indicated in Fig. 73 of the drawings shows an arrangement for securing simultaneously upon the viewing screen 785 directional readings 786 at the observation station in azimuth from three different craft, the various stations 787, 788 and 789 being tuned to different frequencies, these frequencies being the frequency of the respective transmitting craft, for example, 1 mc., 1.2 mc., and 1.4 mc., respectively. The corresponding receiving units 790, 791 and 792 are individually associated with the respective direction-finding units.

The azimuthal or zenith course of three different planes in the air at the same time around an airport may be observed as follows to prevent collisions in the air. Each plane is instructed by radio signal to shift its zenith and azimuth frequency to previously assigned different frequencies, respectively. Azimuthal antennae of direction-finding station 787 are switched in on one frequency, for example 1 mc., by means of sequential switch 793. Azimuthal antennae of direction-finding station 788 are similarly switched in on a second frequency, for example 1.2 mc., and azimuthal antennae 789 are switched in on a third frequency, for example 1.4 mc. This combination produces on the screen 785 the three lines 794, one for each frequency indicating absolute direction in azimuth of each plane.

When any two lines indicative of azimuthal direction or any two lines indicative of zenith direction appear to be about to coincide or to be superposed on the screen, a collision is possible if the planes are in the same horizontal and vertical plane, and flying toward each other, and can be avoided by warning one plane to change its course.

Fig. 74 represents the arrangement of apparatus for securing simultaneously on a common screen 795 determinations of distance in azimuth and for comparative direction in azimuth, the direction-receiving stations 796, 797 and 798 in this instance being located not at the observation station 799 but at points more or less remote therefrom. The connections are otherwise similar to the connections indicated in Fig. 70, but the leads 800, 801, and 802 from the respective stations to the sequential switching device 803 in this instance may be coaxial cables.

In Fig. 75 wherein the receivers 805, 806 and 807 for the respective direction-finding stations are located in close proximity to their respective antennae 808, 809 and 810, the connecting cables 811, 812 and 813 may be audio frequency telephone conductors.

Fig. 76 indicates a duplex arrangement for determinations of distance in azimuth, distance in zenith, and comparative direction both in azimuth and zenith simultaneously on separate adjacently disposed screens 820 and 821 operated from sequential switches 822 and 823, respectively. The receiving stations in this embodiment each comprise both azimuthal and zenith antennae 824—824', 825—825' and 826—826'. Knife switches 827 and 827' serve to disconnect one azimuthal and one zenith antennae, respectively, which are temporarily not required, for example, the antennae 826 and 826'. The inputs of two sets of receiver pairs 828 and 829 are connected respectively to the sequential switches 822 and 823 and the outputs to the tubes having screens 820 and 821, respectively.

As shown in Fig. 77, a single screen arrangement is indicated for the determinations of distance in azimuth and distance in zenith alternatively on the same quadrant 830 of a cathode ray tube screen. This is accomplished by means of the three knife switches 831, 832 and 833, which are positioned in accordance with the desired determination to connect one or the other of the two sets of antenna systems comprising the group 834, 835 and 836 and the group 837, 838 and 839.

A further modification of this arrangement for making determinations of distance in azimuth and distance in zenith in different quadrants of the cathode ray tube beam is shown in Fig. 78 wherein the two corresponding antenna systems, comprising the group 845, 846 and 847 and the group 848, 849 and 850, are shown as permanently connected to independently operating, sequential switching devices 851 and 852, respectively. These in turn, through corresponding identical receiver unit pairs 853—853' and 854—854', connect two separate antenna systems to the deflectors of a cathode ray tube 855 in the following manner.

This tube has two sets of four deflectors each. One set is of the electrostatic type consisting of four plates, two for horizontal deflection and two for vertical deflection. The other set is of the electromagnetic type, consisting of four coils, two for horizontal and two for vertical deflection.

The deflection paths for each set of electrostatic or electromagnetic deflectors is the same, that is, the spot is deflected to the same position on the screen, whether by electrostatic or electromagnetic deflection of the same sign. The electrostatic deflectors 857 and 858 of the tube serve for deflection in one quadrant of the screen and the electromagnetic deflectors 859 and 860 serve for deflection in the diametrically opposite quadrant.

The outputs of receivers 853 and 853' serve to deflect the beam spot of the tube 855 to the quadrant 861 of the screen, by the combined action of horizontal and vertical deflection of the electrostatic plates 857—858. The outputs of receivers 854 and 854' serve to deflect the beam spot of the tube to the diametrically opposite quadrant 862 of the screen by the combined action of vertical and horizontal deflection of the electromagnetic deflector coils 859 and 860.

The electrostatic deflectors are to be polarized positively by means of rectifiers 857' and 858', and the electromagnetic deflectors are to be polarized negatively by the reversed rectifiers 859' and 860', the different polarizations resulting in deflections in diametrically opposite quadrants due to alternate transmission of azimuthal and altitudinal signals. The remaining pair of each set of deflectors is to be grounded, in the usual manner.

Figs. 79 to 82, inclusive, are characterized by the representations of the combination of elements for the determination of distance and absolute direction. In Fig. 79 the arrangement shown provides for the determination of distance in zenith and absolute direction in zenith. One of the group of antennae remotely located with respect to an observation station 870, for example the antenna station 871 of the group 871, 872 and 873, is disconnected by means of the knife switch 875; and the zenith antenna 876 located at the observation station 870 is substituted. This station provides absolute direction. The said remotely located zenith stations 872 and 873, connected to the sequential switching device 877, serve to transmit energy to the receivers 878 and 879, which, in turn, energize the deflector plates of the cathode ray screen 880. The result is to produce on the said screen altitudinal distance indications 881 as produced by the remotely located zenith antennae 872 and 873 and absolute direction indication 882 in zenith as produced by the antenna 876 which is located in close proximity to the observation station.

Fig. 80 represents a similar arrangement, except that the direction-finding stations are provided with antennae 885 and 886 suitable for measuring distances in azimuth.

The two combinations illustrated in Figs. 81 and 82 provide for measurements of absolute direction from the observation station 890 in azimuth by means of the direction-finding unit having the vertically polarized antenna 891. By throwing the switch 892 to disconnect a further and similar antenna 893 located at a point remote from the observation station 890 and connect in the antenna 891, determinations of absolute direction in azimuth may be made. Indications from the remote antennae 894 and 895 afford distance determinations in zenith.

In Fig. 82 the corresponding remotely-located antennae 894 and 895, shown in Fig. 81, are replaced by vertically polarized antennae 896 and 897 whereby distance determinations in azimuth may be determined, as well as absolute direction in azimuth from antenna 898.

The hereinbefore described system provides for tracing visually from a stationary or moving observation point the course of fast-moving craft, at the same time indicating three dimensions in space relative thereto, namely: azimuthal and altitudinal direction, with distance from the observation point to the craft.

When combined at an airport with the system for distance determining described in my U. S. Patent No. 2,255,659, which may be used by aircraft pilots as a long-range blind-landing aid, a two-way, three-dimensional navigational system may be provided by which the craft pilot is able to locate the airport and the airport observer is able to locate the craft, both of these operations being possible continuously within the range of the apparatus.

I claim:

1. A radio navigational system, comprising a single transmitter of electromagnetic waves including a pulse generator having a straight-line modulation characteristic, a plurality of direction-finding means for the electromagnetic waves remotely located with respect to the transmitter thereof and positioned respectively in predetermined relationship to an observation point, each of said direction-finding means being tuned to the said transmitter and including two directional receiving elements located at a predetermined angle to each other, and means to tune both receiving elements to the radiated frequency, together with two translation means operatively associated with the respective receiving elements and tuning means, the whole affording two substantially identical receiver channels, cathode ray tube means operatively coupled to said receiver channels and having a viewing screen including an indicating scale, whereby the received energy produces a plurality of divergent linear traces adapted for cooperation with said scale.

2. The system of claim 1, wherein means are provided to effect automatically and sequentially the transmission of the respective effects of the energy received by the direction-finding means.

3. The system of claim 1, wherein the transmitter comprises a horizontally polarized and a vertically polarized transmitting antenna.

4. The system of claim 1, wherein there is associated with the said transmitter a pulse generator for modulating the transmitted energy, said generator being of the electrodynamic type having widely-separated, narrow pole tips to afford a sharply peaked wave.

5. The system of claim 1, wherein there is associated with the said transmitter a pulse generator for modulating the transmitted energy, said generator being of the polyphase electrodynamic type having widely-separated, narrow pole tips affording a sharply peaked wave.

6. The system of claim 1, wherein there is associated with the said transmitter a pulse generator for modulating the transmitted energy, said generator being of the polyphase electrodynamic type having widely-separated, narrow and characterizing pole tips affording sharply peaked waves.

7. The system of claim 1, wherein there is associated with the said transmitter a pulse generator for modulating the transmitted energy, said generator being of the electrostatic type having widely-separated, narrow pole tips affording a sharply peaked wave.

8. The system of claim 1, wherein there is associated with the said transmitter a pulse generator for modulating the transmitted energy, said generator being of the relaxation type with electronic tube characteristics affording a sawtoothed wave.

9. The system of claim 1, wherein there is associated with the said transmitter a pulse generator for modulating the transmitted energy, said generator being of the relaxation type with electronic tube characteristics affording a flat-topped wave.

10. The system of claim 1, wherein the transmitter comprises a horizontally polarized and a vertically polarized transmitting antenna, together with means to energize both antennae.

11. The system of claim 1, wherein the transmitter comprises a horizontally polarized and a vertically polarized transmitting antenna, each transmitting on a different frequency.

12. A radio navigational system according to claim 1, wherein the transmitted electromagnetic waves are polarizable in a horizontal or in a vertical plane, and means are provided for selecting the polarization of the direction-finding means to conform to a selected polarization of the transmitter.

13. A radio navigational system according to claim 1, wherein the transmitted electromagnetic waves are polarizable in a horizontal and in a vertical plane, and the respective polarized waves are alternately transmitted at different frequencies, and means are provided for selecting the polarization of the direction-finding means to conform to a selected polarization of the transmitter.

14. The system of claim 1, wherein each of the direction-finding means comprises a pair of directional antennae which are displaced at a predetermined angle with respect to each other and whose differential effect is transmitted to the visual indicator means, one member of each pair being oriented to the same geographical bearing.

15. The system of claim 1, wherein each of the direction-finding means comprises a pair of directional antennae which are displaced at a predetermined angle with respect to each other and whose differential effect is transmitted to the visual indicator means, one member of each pair being oriented to the same geographical bearing, and means are provided to orient through equal arcs the pairs of directional antennae to a different position.

16. The system of claim 1, wherein the translation means of a directional receiver means comprises means for modifying for identification of the geographical location of said direction-finding means the character of the translated energy of such receiver means as shown on the visual indicator means.

17. The system of claim 1, wherein the visual indicator comprises a cathode ray screen upon which the indicia appear as divergent straight lines and in which a signal generator of electromagnetic waves local to a direction-finding means is provided for test, with the translation means embodying two identical receiver units together with means for maintaining the outputs from the respective receiver units identical, and means for applying alternately said respective outputs to the cathode ray screen for simultaneous viewing of the two indicia representative of the locally developed energy.

18. The system of claim 1, wherein the visual indicator means comprises a cathode ray tube with screen and the received energy is provided as modulated direct current by the translation means for actuating the beam spot of said tube, whereby the image appears as a straight line indicium upon the screen radiating from a central point thereof.

19. The system of claim 1, wherein the visual indicator means comprises a cathode ray tube with screen and the received energy is provided as modulated direct current by the translation means for actuating the beam spot of said tube, whereby the image appears as a straight line indicium upon the screen radiating from a central point thereof, each direction-finding means affording a corresponding indicium and the respective indicia diverging from the central point.

20. The system of claim 1, wherein the visual indicator means comprises a cathode ray tube with screen and the received energy is provided as modulated direct current by the translation means for actuating the beam spot of said tube, whereby the image appears as a straight line indicium upon the screen radiating from a central point thereof, each direction-finding means affording a corresponding indicium and the respective indicia diverging from the central point, and in which means are provided for varying the light continuity of selected indicia.

21. The system of claim 1, wherein the visual indicator means comprises a cathode ray tube with deflectors and screen, together with means for producing on said screen from the transmitted energy an image which appears as a straight line indicium, said image-producing means including pulse generating means for modulating the transmitted energy, and rectifying and filter means associated with the translation means and connected with the tube deflectors for deflecting the spot of said tube to return the same periodically to a predetermined position on the screen in accordance with the operation of the pulse generating means.

22. The system of claim 1, wherein the visual indicator means comprises a cathode ray tube with deflectors and screen, together with means for producing on said screen from the transmitted energy an image which appears as a straight line indicium, said image-producing means including pulse generating means located at the receiving elements for modulating the transmitted energy, and rectifying and filter means associated with the translation means and connected with the tube deflectors for deflecting the spot of said tube to return the same periodically to a predetermined position on the screen in accordance with the operation of the pulse generating means.

23. The system of claim 1, wherein the visual indicator means comprises a cathode ray tube with deflectors and screen, together with means for producing on said screen from the transmitted energy an image which appears as a straight line indicium, said image-producing means including pulse generating means located at the translation means for modulating the transmitted energy, and rectifying and filter means associated with the translation means and connected with the tube deflectors for deflecting the spot of said tube to return the same periodically to a predetermined position on the screen in accordance with the operation of the pulse generating means.

24. The system of claim 1, wherein the visual indicator means comprises a cathode ray tube with deflectors and screen, together with means for producing on said screen from the transmitted energy an image which appears as a straight line indicium, said image-producing means including pulse generating means for modulating the transmitted energy having a rising and falling voltage curve embodying two substantially parallel lines, and rectifying and filter means associated with the translation means and connected with the tube deflectors for deflecting the beam spot of said tube to return the same periodically to a predetermined position on the screen in accordance with the operation of the pulse generating means.

25. The system of claim 1, wherein the visual indicator means comprises a cathode ray tube with deflectors and screen, together with means for producing on said screen from the transmitted energy an image which appears as a straight line indicium, said image-producing means including pulse generating means for modulating the transmitted energy having a rising and falling voltage curve with flat top, and rectifying and filter means associated with the translation means and connected with the tube deflectors for deflecting the beam spot of said tube to return the same periodically to a predetermined position on the screen in accordance with the operation of the pulse generating means.

26. The system of claim 1, wherein the visual indicator means comprises a cathode ray tube with deflectors and screen, together with means for producing on said screen from the transmitted energy an image which appears as a straight line indicium, said image-producing means including pulse generating means for modulating the transmitted energy having a sawtooth voltage curve, and rectifying and filter means associated with the translation means and connected with the tube deflectors for deflecting the beam spot of said tube to return the same periodically to a predetermined position on the screen in accordance with the operation of the pulse generating means.

27. The system of claim 1, wherein the visual indicator means comprises a cathode ray tube with deflectors and screen, together with means for producing on said screen from the transmitted energy an image which appears as a straight line indicium, said image-producing means including pulse generating means for modulating the transmitted energy, and rectifying and filter means associated with the translation means having a time constant coordinated with the frequency of the pulse generating means and connected with the tube deflectors for deflecting the beam spot of said tube to return the same periodically to a predetermined position on the screen in accordance with the operation of the pulse generating means.

28. The system of claim 1, wherein the visual indicator includes two cathode ray tubes with their screens abutting, both of said screens having alternate portions of their respective fluorescent surfaces removed in staggered relationship whereby the respective indicia may be simultaneously viewed through a transparent portion of one of the tubes.

29. The system of claim 1, wherein the visual indicator includes two cathode ray tubes with their screens abutting, the respective tubes manifesting the indicia as corresponding images of different colors upon their respective screens.

30. The system of claim 1, wherein the visual indicator means comprises an optical screen.

31. The system of claim 1, wherein the indicia are manifested as images corresponding in number to the number of direction-finding means and the visual indicator means comprises an optical screen, and means to superpose the respective images upon said optical screen.

32. The system of claim 1, wherein the indicia are manifested as images corresponding in number to the number of direction-finding means and the visual indicator means comprises an optical screen, means to superpose the respective images upon said optical screen, and associated means for magnifying the images.

33. The system of claim 1, wherein the direction-finding means includes translation means and the visual indicator means comprises a cathode ray tube having a screen and beam spot deflecting means, and means are provided to connect sequentially the said deflecting means to the respective direction-finding means to produce in juxtaposition upon the screen indicia in the form of divergent lines representing the individual energy effects of each direction-finding means.

34. The system of claim 1, wherein each of the direction-finding means includes translation means and the visual indicator means comprises a cathode ray tube having a screen and beam spot deflecting means, and means are provided to connect sequentially the said deflecting means to the respective translation means to produce in juxtaposition upon the screen indicia in the form of divergent lines representing the individual energy effect of each translation means.

35. The system of claim 1, wherein the visual indicator means comprises a cathode ray tube and means for producing line images on the screen thereof, together with means affecting the image-producing means, controlled by the respective effects of the translation means, to vary the light continuity of the produced line images to characterize the said transmitted effects of the different direction-finding means.

36. The system of claim 1, wherein the visual indicator means comprises a cathode ray tube with deflectors and screen upon a quadrant of which the indicia appear as characteristic images and in which the said screen is overlaid by a fixed transparent cartograph member having delineated thereon the desired features of the surrounding terrain, and having identifying marks indicative of the respective direction-finding means locations for determining the position of the transmitter over the terrain.

37. The system of claim 1, wherein the visual indicator means comprises a cathode ray tube with deflectors and screen upon a quadrant of which the indicia appear as characteristic images and in which the said screen is overlaid by a fixed transparent cartograph member having delineated thereon the desired features of the surrounding terrain, and having identifying marks indicative of the respective direction-finding means locations for determining the position of the transmitter over the terrain, and there are provided means for the angular displacement of the active portion of the cathode ray screen with respect to the cartograph to cause an image on the active quadrant to coincide with the delineated earth sector in which the transmitter is located.

38. The system of claim 1, wherein the visual indicator means comprises a cathode ray tube with deflectors and screen upon a quadrant of which the indicia appear as characteristic images and in which the said screen is overlaid by a fixed transparent cartograph member having delineated thereon the desired features of the surrounding terrain, and having identifying marks indicative of the respective direction-finding means locations for determining the position of the transmitter over the terrain, and there are provided mechanical means for the angular displacement of the cathode ray screen with respect to the cartograph to cause an image on the active quadrant to coincide with the delineated earth sector in which the transmitter is located.

39. The system of claim 1, wherein the visual indicator means comprises a cathode ray tube with deflectors and screen upon a quadrant of which the indicia appear as characteristic images and in which the said screen is overlaid by a fixed transparent cartograph member having delineated thereon the desired features of the surrounding terrain, and having identifying marks indicative of the respective direction-finding means locations and for determining the position of the transmitter over the terrain, and there are provided electrical switching means for causing the image on the cathode ray screen to appear in a selected quadrant of the screen coinciding with the earth sector in which the transmitter is located.

40. The system of claim 1, wherein the visual indicator means comprises a cathode ray tube with deflectors and screen upon a quadrant of which the indicia appear as characteristic images and in which the said screen is overlaid by a fixed transparent cartograph member having delineated thereon the desired features of the surrounding terrain, and having identifying marks indicative of the respective direction-finding means locations and for determining the position of the transmitter over the terrain, and means for rectifying the output energy from the translation means through two separate channels thereof, and there are provided electrical switching means for transferring the respective rectified energies to corresponding pairs of deflectors including means to reverse the polarity of the rectifiers with respect to alternate pairs of deflectors and to shift the connections from the chanels to selected pairs the connections from the channels to selected pairs of deflectors.

41. The system of claim 1, wherein the direction-finding means are located in proximity to the observation point and on the circumference of a circle.

42. The system of claim 1 wherein the direction-finding means are located in proximity to the observation point and on the circumference of a circle, with similar direction-finding means located on the circumference of a circle relatively remote from the first-named circle and concentric therewith, and additional means are provided to transmit to the visual indicator means the energy received by the second-named direction-finding means.

43. A system for the continuous visual determination of distance between two points by means of transmitted electromagnetic waves, which comprises a single transmitter of electromagnetic waves including a pulse generator having a straight-line modulation characteristic, and a plurality of direction-finding means for the electromagnetic waves remotely located with respect to the transmitter thereof and positioned respectively in predetermined relationship to an observation point, each of said direction-finding means being tuned to the said transmitter and including two directional receiving elements located at a predetermined angle to each other, means to tune both receiving elements to the radiated frequency, together with two translation means operatively associated with the respective receiving elements and tuning means, the whole affording two substantially identical receiver channels, cathode ray tube means operatively coupled to said receiver channels and having a viewing screen including an indicating scale, the respective effects of the energy received by the direction-finding means appearing on the viewing screen as respective divergent linear traces for juxtaposition thereon with respect to one another and at least two with respect to the scale which is graduated for distance.

44. The system of claim 43, wherein the viewing screen means includes an additional scale cooperating with an intermediate trace for determination of the direction of the transmitter with respect to the observation point.

45. The system of claim 43, wherein a switching means is provided for sequentially applying the received energies from the respective direction-finding means to the tube, said switching means including rotating contact elements in number corresponding to the number of direction-finding means and adapted to establish temporary recurring connection between the respective direction-finding means and the said tube.

46. The system of claim 43, wherein the translation means are associated with each of the direction-finding means, and a switching means is provided for sequentially applying the energy effects of the respective translation means to the tube, said switching means including rotating contact elements in number corresponding to the number of direction-finding means and adapted to establish temporary recurring connection between the respective translation means and the said tube.

47. The sytem of claim 43, wherein the translation means are connected with said tube, and a switching means is provided for sequentially establishing temporary recurring connection of the respective direction-finding means with the translation means.

48. The system of claim 43, wherein a switching means is provided for sequentially applying the received energy from the respective direction-finding means to the tube, said means including rotating contact elements in number corresponding to the number of direction-finding means and adapted to establish temporary recurring connection between the respective direction-finding means and the said tube, and additional contact-making elements rotating with the first-named contact-making elements and of total like contact duration, said latter elements affording interruptions of contact for the respective durations of different characteristics and the latter contact elements applying biases of variable continuity to the control grid of the cathode ray tubes.

EDWARD G. GAGE.